US007495793B2

United States Patent
Kojima et al.

(10) Patent No.: US 7,495,793 B2
(45) Date of Patent: Feb. 24, 2009

(54) IMAGE PROCESSING METHOD, IMAGE PROCESSING APPARATUS, AND PRINT APPARATUS THAT USES IMAGE DATA RECORDED ON AN IMAGE RECORD MEDIUM

(75) Inventors: Shoji Kojima, Nagano (JP); Hideyuki Narusawa, Nagano (JP); Yoichiro Maki, Nagano (JP); Takeshi Sekiya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 820 days.

(21) Appl. No.: 10/954,346

(22) Filed: Oct. 1, 2004

(65) Prior Publication Data

US 2005/0195435 A1 Sep. 8, 2005

(30) Foreign Application Priority Data

| Oct. 1, 2003 | (JP) | ............................ P2003-342773 |
| Jan. 22, 2004 | (JP) | ............................ P2004-014974 |
| Sep. 27, 2004 | (JP) | ............................ P2004-280569 |

(51) Int. Cl.
*G06F 12/00* (2006.01)
*G06F 13/00* (2006.01)
*G06F 15/16* (2006.01)
*G06F 3/12* (2006.01)
*G06F 15/00* (2006.01)
*G06F 1/00* (2006.01)
*G06K 15/00* (2006.01)

(52) U.S. Cl. ...................... 358/1.16; 358/1.13; 709/208; 709/209; 711/149

(58) Field of Classification Search ................. 709/208, 709/209; 711/149; 358/1.16, 1.13
See application file for complete search history.

(56) References Cited

U.S. PATENT DOCUMENTS

| 6,417,913 B2 * | 7/2002 | Tanaka ........................ 355/39 |
| 6,476,929 B1 * | 11/2002 | Tanaka ...................... 358/1.17 |
| 6,771,383 B1 * | 8/2004 | Ogaki et al. ............... 358/1.15 |
| 6,948,792 B2 * | 9/2005 | Narusawa et al. ............. 347/19 |
| 2003/0081237 A1 * | 5/2003 | Ogiwara et al. ............ 358/1.14 |
| 2004/0179228 A1 * | 9/2004 | McCluskey et al. ........ 358/1.15 |
| 2004/0223185 A1 * | 11/2004 | Yamada et al. ............. 358/1.15 |
| 2006/0078230 A1 * | 4/2006 | Kimura ...................... 382/309 |

FOREIGN PATENT DOCUMENTS

| JP | 06-337916 A | 12/1994 |
| JP | 2000-118089 A | 4/2000 |
| JP | 2001-030550 A | 2/2001 |
| JP | 2002-218205 A | 8/2002 |
| JP | 2002-305701 A | 10/2002 |

* cited by examiner

*Primary Examiner*—Twyler L Haskins
*Assistant Examiner*—Fred Guillermety
(74) *Attorney, Agent, or Firm*—Sughrue Mion, PLLC

(57) ABSTRACT

When a memory card is placed in a printer, a service layer requests a file list manager to create an image information list. When the memory card is removed, the service layer requests the file list manager to discard the image information list. When image data is written onto the memory card by a host computer PC or a scanner function of the printer, when a print command is issued, the service layer requests the file list manager to update the list. When the image data is changed by the scanner, the list is updated; when the image data is changed by the host computer PC, the list is maintained.

9 Claims, 28 Drawing Sheets

IMAGE PROCESSING METHOD, IMAGE PROCESSING APPARATUS, AND PRINT APPARATUS THAT USES IMAGE DATA RECORDED ON AN IMAGE RECORD MEDIUM

BACKGROUND OF THE INVENTION

This invention relates to an image processing method, an image processing apparatus, and a print apparatus capable of performing image processing of print, etc., based on image data recorded on an image record medium such as a memory card, for example.

In recent years, direct print of printing without the intervention of a host computer (personal computer) has been realized with the widespread use of digital cameras. In the direct print, for example, a memory card recording image data photographed by a digital camera can be placed in a printer so as to read and print the image data recorded on the memory card (patent document 1).

For example, if the user operates an index print key after placing a memory card in a card slot of a printer, thumbnail image data of the images recorded on the memory card are read. A plurality of thumbnail images are printed side by side per index sheet. If the number of the images is large, a plurality of index sheets are printed out. The user can check the images recorded on the memory card by viewing the index sheet. After checking any desired image on the index sheet, the user enters the identification code identifying the desired image through an operation panel of the printer. Accordingly, only the image desired by the user can be printed out.

Patent document 1: Japanese Patent No. 3127902

In the related art described above, a memory card can also be accessed from a host such as a personal computer for performing update work of image data (image addition, overwrite, etc.,). Thus, the storage configuration of the memory card (directory structure) changes, but the printer cannot keep track of the most recent storage configuration of the memory card until the memory card is once removed and is then placed in the printer.

In recent years, a complex print apparatus provided by integrating a scanner into a printer has also been known. If image data read through the scanner can be written onto the memory card placed in the printer, the storage configuration of the memory card also changes accordingly. Thus, as image data is written onto a memory card from an external personal computer or an internal scanner, the storage configuration of the memory card changes, but the storage configuration change timing and the recognition timing of the printer do not match.

Therefore, if the user wants to print new image data added to the memory card, the user cannot select image data based on the most recent storage configuration of the memory card before the printer recognizes the most recent storage configuration; the ease of use is poor.

SUMMARY OF THE INVENTION

It is therefore an object of the invention to provide an image processing method, an image processing apparatus, and a print apparatus capable of performing image processing based on the most recent configuration of an image record medium. It is an object of the invention to provide an image processing method, an image processing apparatus, and a print apparatus capable of reflecting change in the storage configuration of an image record medium at a necessary timing without incurring an excessive increase in load. It is an object of the invention to provide an image processing apparatus and a print apparatus for making it possible to display, select, and print based on the most recent storage configuration of an image record medium if the most recent storage configuration of the image record medium becomes necessary. It is an object of the invention to provide an image processing method, an image processing apparatus, and a print apparatus capable of varying the timing of keeping track of the storage configuration of an image record medium depending on whether the storage configuration of the image record medium is changed from an external data generation apparatus or an internal image data generation unit.

To the ends, according to the invention, there is provided an image processing method including the steps of reading image management information stored on an image record medium through an interface unit of an image information apparatus; generating an image information list based on the read image management information and storing the image information list in a storage unit of the image information apparatus; updating the image information list stored in the storage unit if image data stored on the image record medium is changed; and reading the image data from the image record medium through the interface unit based on the image information list and performing predetermined image processing for the read image data.

For example, a storage device such as a memory card, a PC card, or a small hard disk unit is used as the image record medium. The image record medium need not be shaped like a card and various shapes like a disk, a rod, a cube, etc., can be adopted, for example. The image record medium need not be detachable from an image processing apparatus; for example, it may be a hard disk unit, etc., provided in the image processing apparatus. The image record medium may be connected to the image processing apparatus in either or both of wired and wireless manners. Further, the image record medium can include not only a medium for storing image data, but also an electronic circuit, etc., for accessing the medium. That is, for example, the whole of an image record drive may be able to be inserted into and extracted from the image processing apparatus.

At least one or more (usually, a large number of) pieces of image data (in the description to follow, the image data may be called file) are recorded on the image record medium in a format such as JPEG or TIFF (Tagged Image File Format), for example. The image information list provides information according to which the file names, the file paths, etc., of the files stored on the image record medium can be managed. That is, for example, the image information list is information generated as required to manage the files stored on an image record medium outside the image record medium, and is stored in the storage unit in the image processing apparatus. For example, volatile or nonvolatile local memory, etc., such as internal RAM can be used as the storage unit. For example, the image information list can contain the file name, the file path, the time stamp, and any other attachment information of image data.

In addition to image data, image management information can also be stored on the image record medium. For example, either or both of first management information stored in a management information storage area provided in the image record medium and second management information contained in the image data stored on the image record medium can be used as the image management information. For example, FAT (File Allocation Table) can be named as the first management information. In the FAT, for example, information of the file name, the storage location information, the directory name, the photographing date, etc., of image data is managed. On the other hand, for example, information of file size and color space specification information, etc., contained in the header part of image data can be named as the second management information. The image information list can be created using both the first management information and the second management information or with only the first management information.

The image processing apparatus can further include a print unit for printing based on print data generated by an image processing unit and can also be implemented as a print apparatus. However, the image processing apparatus is not limited to a print apparatus; for example, it may be implemented as a part of a display, a mobile telephone, a portable information terminal, or an equivalent thereof.

The image data and the image management information stored on the image record medium can be accessed through the interface unit of the image processing apparatus. The physical layer of the interface unit may be wired or wireless and may be of contact type or non-contact type.

An image information list is generated based on the image management information read from the image record medium through the interface unit and is stored in the storage unit in the image processing apparatus. If the image data stored on the image record medium is changed, the image information list is updated. For example, addition and deletion of image data can be named as the image data change. The most recent storage configuration of the image record medium is reflected on the updated image information list. The image data is read from the image record medium and predetermined image processing is performed based on the updated image information list.

The image data change timing and the image information list update timing need not synchronize with each other and when a predetermined timing comes after the image data is changed, the image information list can also be updated. The image data can be processed based on the most recent storage configuration as compared with the case where the image information list is updated only when the image record medium is placed in the image processing apparatus to update the image information list if the image data stored on the image record medium is changed.

The image processing apparatus can have a first interface unit connected to a first image record medium and a second interface unit connected to an external data generation apparatus. In the step of updating the image information list, if the external data generation apparatus changes the image data stored on the first image record medium through the second interface unit, updating the image information list can be suppressed and if an image data generation unit of the image processing apparatus changes the image data stored on the first image record medium, the image information list can also be updated.

The first image record medium is a concept contained in "record medium" of the invention; for example, a memory card, an internal hard disk unit, etc., as described above can be named. The image data generation unit is placed in the image processing apparatus; for example, an image reader such as a scanner or a digital camera, a file generation program for creating a different file using already existing image data, etc., can be named. A personal computer, etc., can be named as the external data generation apparatus.

The first image record medium can be accessed using the first interface unit or the second interface unit. For example, if the external data generation apparatus that can be represented as an external image change unit or image input unit changes the image data in the image record medium, the image information list is not updated. In contrast, for example, if the image data generation unit that can be represented as an internal image change unit or image input unit changes the image data in the image record medium, the image information list is updated. Accordingly, if the external data generation apparatus changes the image data, the image information list can be maintained intact; if the image data generation unit changes the image data, the most recent image information list can be obtained.

The image processing apparatus can have a first interface unit connected to the first image record medium and a third interface unit connected to a second image record medium. Further, the image processing apparatus includes a first mode in which the image processing apparatus operates as a slave device for updating the image data stored on the first image record medium through the first interface unit and a second mode in which the image processing apparatus operates as a master device for updating the image data stored on the second image record medium through the third interface unit. In the step of updating the image information list, if the image processing apparatus executes the first mode, updating the image information list can be suppressed and if the image processing apparatus executes the second mode, the image information list can also be updated.

For example, a magneto-optical disk unit, a disk drive such as a CD-R or a DVD-R, a hard disk unit, etc., can be named as the second image record medium. The first image record medium and the second image record medium may be media of different types or may be media of the same type. A plurality of (or different types of) image record media of the first and second image record media can be connected to the image processing apparatus.

If the image processing apparatus operates as a slave device for updating the image data on the first image record medium through the first interface unit (first mode), the image information list is not updated and is maintained intact. In contrast, if the image processing apparatus operates as the master device for updating the image data on the second image record medium through the third interface unit (second mode), the image information list is updated.

In the step of updating the image information list, if the image data stored on the first image record medium is changed, the information concerning the changed image data can also be added to or deleted from the image information list, thereby updating the image information list. For example, the file name and the file path of the image data can be named as the information concerning the image data.

The step of updating the image information list can include a step of adding or deleting the file name of the changed image data to or from the image information list if the image data stored on the image record medium is changed and a step of sorting the image information list based on the file names of the image data.

That is, after the file name of the added image data is added to the image information list or the file name of the deleted image data is deleted from the image information list, the image data registered in the image information list can be sorted. This eliminates the need for sorting the image information list each time the image data is added or deleted. In addition to the file name, for example, information of the type, the file path information, the date, etc., of the file can also be added or deleted together.

The step of updating the image information list can include a step of generating a new image information list based on the image management information stored on the image record medium. Likewise, the step of updating the image information list can also include a step of generating a new image information list based on the image management information stored on the second image record medium.

The predetermined image processing is print processing and in the step of updating the image information list, the image information list stored in the storage unit can be updated at a predetermined timing. This predetermined timing can be the timing when a print command of the image data stored on the image record medium is issued. That is, when the user selects image data recorded on the image record medium and enters a print command, if the image information list is updated, it is made possible to select image data based on the most recent storage configuration. The image information list can be updated without incurring an excessive increase in the processing load as compared with the case where the image information list is updated whenever the storage configuration of the image record medium changes.

In the step of updating the image information list, if the image data stored on the image record medium has been updated a predetermined number of times or more, the image information list stored in the storage unit can be updated. That is, for example, as many pieces of image data as a predetermined number or more have been added to or deleted from the image record medium, the image information list is updated based on the most recent state of the image record medium.

That is, in the step of updating the image information list, if the image data stored on the image record medium has been updated the predetermined number of times previously specified, the image information list stored in the storage unit can be updated, and before the image data is updated the predetermined number of times, updating the image information list can be suppressed. For example, if the number of times image data has been changed reaches a predetermined number of times or if the image data change operation is complete, the image information list can be updated.

In the step of updating the image information list, if as many pieces of the image data as a predetermined number previously specified have been added, the image information list stored in the storage unit can also be updated. If image data addition processing is discontinued, even if the predetermined number previously specified is not reached, the image information list can be updated. That is, if as many pieces of the image data as the predetermined number previously specified have been added to the image record medium or if addition of the image data is discontinued before as many pieces of the image data as the predetermined number are added to the image record medium, the image information list can be updated.

Further, in the step of updating the image information list, a different search range to update the image information list can also be set in response to the change source for changing the image data stored on the image record medium.

That is, for example, if one change source (or access source) accesses an image record medium, all record areas of the image record medium are searched and the image information list can be updated and if another change source accesses the image record medium, only a specific record area of the image record medium is searched and the image information list can be updated. The search range for updating is thus changed in response to the type of change source, whereby it is made possible to appropriately update the image information list in response to the change source.

In the step of updating the image information list, a different search range to update the image information list can also be set depending on whether the directory structure that can be operated by the access source (or change source) accessing the image record medium is already known or is unknown. That is, if the directory structure that can be operated is already known, the most recent image information list can be obtained based only on the information concerning the directory that can be operated (for example, header information contained in image data or image management information such as FAT). If the directory structure that can be operated cannot previously be grasped, the most recent image information list can be obtained based on the information concerning all directories or most directories of the image record medium (for example, header information contained in image data or image management information such as FAT).

The image processing apparatus can have a first interface unit connected to a first image record medium and a second interface unit connected to an external data generation apparatus. In the step of updating the image information list, if the external data generation apparatus changes the image data through the second interface unit, a new image information list is generated based on the image management information stored on the first image record medium and when an image data generation unit of the image processing apparatus adds image data, the information concerning the added image data can be added to the image information list. Only either of the external data generation apparatus and the image data generation unit can exclusively access the image data medium for changing (for example, adding or deleting) the image data.

That is, to add image data by the image data generation unit, the image processing apparatus can keep track of where image data is written onto the image record medium and thus the image information list can be updated based on the information concerning only the added image data. In contrast, if the external data generation apparatus changes the image data on the image record medium, it is difficult to keep track of where image data is written onto the image record medium. When the external data generation apparatus accesses the image record medium through firmware of the image processing apparatus, the accessed place can be recognized, but responsiveness is degraded if access is made via the firmware of the image processing apparatus. From the viewpoint of access performance, when the external data generation apparatus directly accesses the image record medium, it is difficult to detect where image data is written. Then, if the external data generation apparatus makes access, an image information list is again created based on the image management information.

In one form of the invention, if an image record medium is connected to the first interface unit, an image information list is created and is retained in an internal storage unit. When a predetermined timing comes, the retained image information list is updated and when the image record medium and the first interface unit are disconnected, the retained image information list is discarded.

According to another aspect of the invention, there is provided an image processing apparatus including a first interface unit for transmitting and receiving data to and from a first image record medium for recording at least image data; a storage unit for storing an image information list generated based on image management information recorded on the first image record medium; an update management unit for managing update of the image information list stored in the storage unit; and an image processing unit for reading the image data from the first image record medium through the first interface unit based on the image information list and performing predetermined image processing, wherein if the image data stored on the first image record medium is changed, the update management unit updates the image information list.

According to still another aspect of the invention, there is provided a print apparatus including an access unit for accessing a memory card for storing image data; a unit for selecting the image data stored on the memory card; a print unit for acquiring the selected image data from the memory card through the access unit and printing the acquired image data; and a deletion unit for deleting the image data stored on the memory card, wherein if the deletion unit deletes the image data from the memory card, the selection unit makes the deleted image data unselectable regardless of whether the memory card is inserted or extracted.

Further, the invention can also be grasped as the following print apparatus: A print apparatus including a interface unit for transmitting and receiving data to and from an image record medium recording at least image data; a storage unit for storing an image information list generated based on the image data recorded on the image record medium; an update management unit for managing update of the image information list stored in the storage unit; an image selection sheet issuance unit for issuing an image selection sheet for selecting image data read from the image record medium through the interface unit based on the image information list; an image read unit for reading a sheet image from the issued image selection sheet; an image processing unit for reading the image data selected by the user from the image record medium through the interface unit based on the read sheet image and the image information list and generating print data; and a print unit for printing based on the generated print data. If the image data on the image record medium is changed, the update management unit can update the image information list either if a predetermined operation command is given or if predetermined processing is performed.

For example, sample images (thumbnail images) representing the images stored on the image record medium, fill marks for selecting the sample images, and the like are printed on the image selection sheet. The user can select the image to be printed by filling the mark corresponding to any desired image with a pen, etc. The image selection sheet issuance unit issues the image selection sheet based on the image information list. The image selection sheet is not limited to a flat sheet and may be shaped like a three-dimensional object like a cylinder, for example, if the image read unit can read its image. Image selection is not limited to a so-called mark sheet system and can also be made as the user circles the sample image itself, etc., for example.

At least some of the units or the steps of the invention may be able to be implemented as a computer program executed by a computer. This computer program can be fixed to various storage media, for example, and can also be distributed through a communication network such as the Internet.

DETAILED DESCRIPTION OF THE PREFERRED EMBODIMENTS

Figure 1:
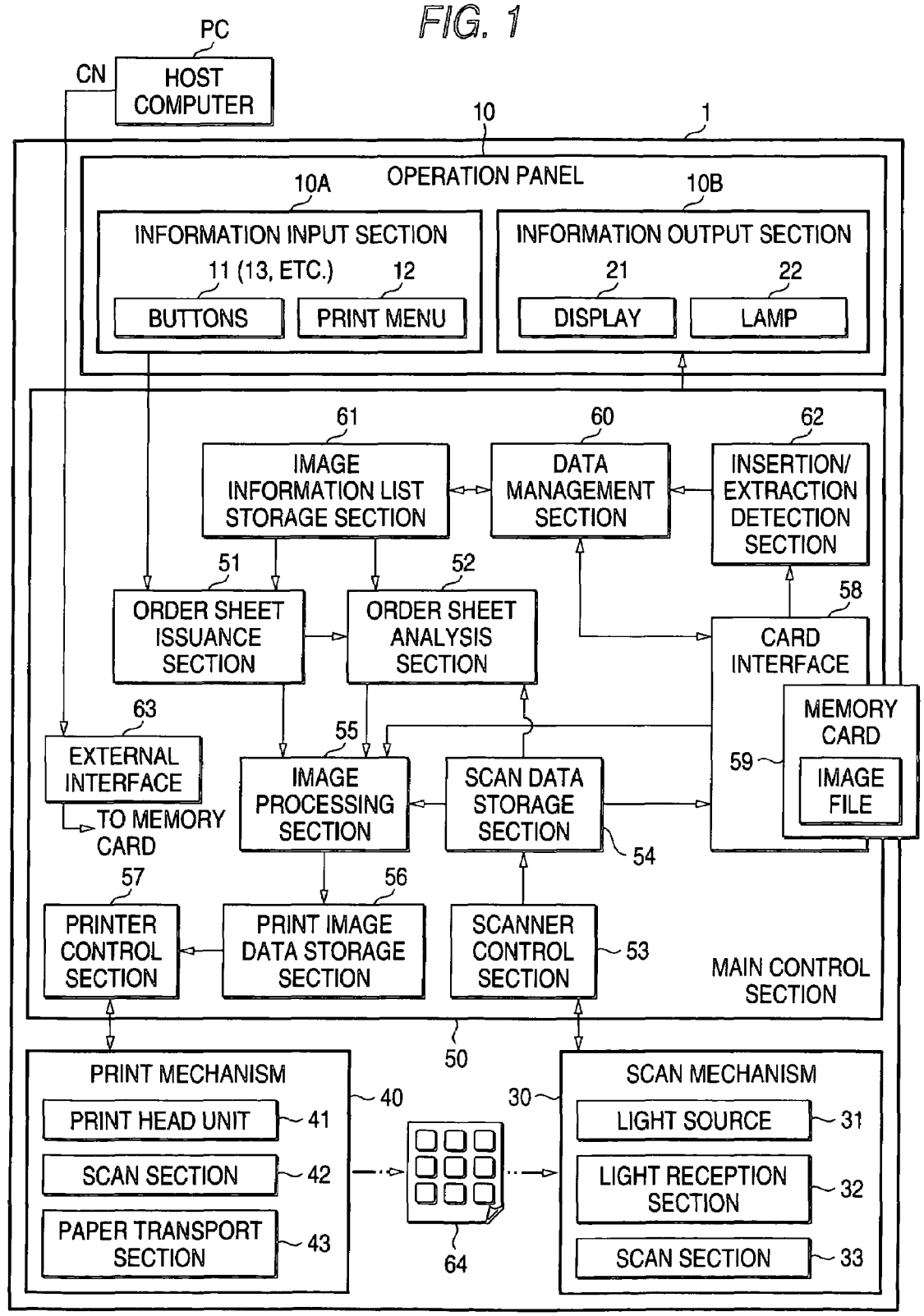
FIG. 1 is a block diagram to show the function configuration of a printer according to a first embodiment of the invention.

An image processing apparatus will be discussed below by taking a print apparatus as an example. FIG. 1 is a block diagram to show the function configuration of a printer 1 according to a first embodiment of the invention. The printer 1 is made up of an operation panel 10, a scan mechanism 30, a print mechanism 40, and a main control section 50 as described later. That is, the printer 1 includes at least a scanner function of reading an image from an original and converting the image into digital data and a printer function (copy function) of printing the read digital data on print paper. The printer 1 further includes a function of receiving image data via a communication cable CN from a digital camera or a host computer PC such as a personal computer and printing the image data, for example. The printer 1 can also read image data from a memory card 59 based on a mark position of an order sheet 64 and print the image data, as described later. This function is called "order sheet print" in the embodiment.

The operation panel 10 is provided on the front of the printer 1 considering the viewability and the operability and provides a man-machine interface including an information input section 10A and an information output section 10B. The information input section 10A contains a plurality of information input units of various buttons 11 and 13, a print menu 12, etc., later described with reference to FIG. 4. The information output section 10B contains a display 21 and a lamp 22, for example.

The scan mechanism 30 is provided in the upper part of the printer 1, for example. The scan mechanism 30 includes a light source 31, a light reception section 32, and a scan section 33 for moving the light reception section 32 in a predetermined direction. The scan mechanism 30 and an original bed 35, an original bed cover 34, and a scanner control section 53 described later make up a scanner. The scanner corresponds to an example of "image data generation unit." The light reception section 32 can be made up of a plurality of line CCDs (charge-coupled devices) including RGB color filters, for example. However, the color filter types are not limited to RGB. Light from the light source 31 is reflected on the surface of an original and becomes reflected light containing object color. This reflected light arrives at the light reception section 32 through a lens, a reflecting mirror, etc., and is converted into an electric signal by the light reception section 32. The optical system structure of the scanner is not limited to that described above and various structures can be adopted. For example, a reduction optical system made up of CCD shorter than the image read plane of the original bed 35 and a plurality of reflecting mirrors and lenses may be used or CCD having roughly the same length as the image read plane may be used. Alternatively, it is also possible to configure using a spectral element such as a diffraction grating.

The print mechanism 40 is provided in the lower part of the printer 1, for example. The print mechanism 40 includes a print head unit 41, a scan section 42 for moving the print head unit 41 in a predetermined direction, and a paper transport section 43 for transporting print paper. The print mechanism 40 and a paper feed tray 44, a paper ejection tray 45, and a printer control section 57 described later make up a printer unit. The print head unit 41 is made up of a large number of nozzles for ejecting ink droplets of colors of cyan, magenta, yellow, black, etc., for example, and drive elements for ejecting ink droplets through the nozzles. The scan section (carriage) 42 includes a carriage motor, etc., for reciprocating the print head unit 41 in the main scanning direction orthogonal to the transport direction of print paper (subscanning direction). The paper transport section 43 includes a paper end detection sensor, a paper delivery motor, etc., for transporting print paper a predetermined amount at a time. The print mechanism 40 can be implemented as a serial print engine capable of printing one character at a time or a line print engine capable of printing one line at a time, for example. The print mechanism 40 can also be implemented as a page printer.

The main control section 50 is implemented as a microcomputer system including an arithmetic processing unit (CPU, etc.,), memory (ROM, RAM, etc.,), an input/output circuit, etc., for example. The main control section 50 can also include a dedicated hardware circuit (ASIC (application-specific integrated circuit)) for executing specific processing. The main control section 50 includes an order sheet issuance section 51, an order sheet analysis section 52, a scanner control section 53, a scan data storage section 54, an image processing section 55, a print image data storage section 56, a printer control section 57, a card interface (I/F) 58, a data management section 60, an image information list storage section 61, an insertion/extraction detection section 62, and an external interface (external I/F) 63 described later. These functions are provided by either hardware circuitry or software or by hardware circuitry and software in cooperation with each other.

The order sheet issuance section 51 causes the order sheet 64 used for order sheet print to be printed out through the print mechanism 40. The order sheet print is a function of requesting the user to select one or more pieces of image data to be printed from among a plurality of pieces of image data recorded on the memory card 59 (only one piece of image data may be recorded) through the order sheet 64 and reading the order sheet 64 with the image already selected using the scanner function, thereby reading the selected image data from the memory card 59 and automatically printing. When the order sheet print is specified through the print menu 12, the order sheet issuance section 51 references the image information list storage section 61, generates data or an instruction for generating the order sheet 64, and inputs the data or the instruction to the image processing section 55. Accordingly, order sheet print data is generated and the order sheet 64 is output from the print mechanism 40.

When a sheet image of the order sheet 64 is read through the scan mechanism 30, the order sheet analysis section 52 analyzes the read sheet image and determines the image selected by the user. The order sheet analysis section 52 determines the image data selected on the order sheet 64 by referencing image information list T1. The image determination result is input to the image processing section 55. The image processing section 55 reads the image data selected by the user from the memory card 59 and generates print data. The invention is not limited to it; for example, the order sheet analysis section 52 may read the image data from the memory card 59 and may input the image data to the image processing section 55.

When the user enters a print execution command by operating either a color copy button 11A or a monochrome copy button 11B, for example, the scanner control section 53 drives the scan mechanism 30 for reading the image of the original placed on the original bed 35. The scanner control section 53 stores the read image data (scan data) in the scan data storage section 54. The scan data storage section 54 is implemented as memory of RAM, etc., for example. The image data stored in the scan data storage section 54 can be written onto the memory card 59 through the card I/F 58. This function is called "scan to memory" function in the embodiment. At the order sheet print time, the order sheet 64 is placed on the original bed 35 and the image on the surface of the order sheet (sheet image) is read as digital data. The sheet image converted into the digital data is used for the order sheet analysis section 52 through the scan data storage section 54. The sheet image may be read as monochrome image data; in addition, the sheet image may be read as color image data.

The image processing section 55 reads the scan data stored in the scan data storage section 54 and performs predetermined image processing, for example, thereby generating print image data. Alternatively, the image processing section 55 generates print data for the order sheet 64 in accordance with notification from the order sheet analysis section 52. The print image data generated by the image processing section 55 is stored in the print image data storage section 56. The print image data storage section 56 is implemented as memory of RAM, etc., for example. The image processing section 55 performs color conversion processing from RGB color system to CMYK color system, scaling-up processing, scaling-down processing, rotation processing, various types of correction processing, halftone processing, etc., for example, thereby generating print image data to drive the print head unit 41. The printer control section 57 acquires the print image data from the print image data storage section 56 and transfers the print image data to the print head unit 41 for executing predetermined print. The printer control section 57 also controls the operation of the scan section 42 and the paper transport section 43.

The card I/F 58 is made up of a card slot in which the memory card 59 is detachably placed, an I/F circuit, and the like, for example. The data management section 60 accesses the memory card 59 through the card I/F 58 and manages image data, etc. Image data, header information, etc., can be read from the memory card 59 through the card I/F 58, and can be written onto the memory card 59 through the card I/F 58. The memory card 59 is a comparatively small, detachable image record medium including storage such as semiconductor memory. The memory card 59 is not limited to a contact image record medium and may be implemented as a non-contact image record medium or a hard disk unit (not shown) incorporated in the printer 1 may be used in place of the memory card 59. Here, data files each for each image are stored on the memory card 59 and each image data file includes header information, thumbnail image data, and essential image data. When an image of a subject is picked up by a digital camera, high-resolution essential image data can be provided. The thumbnail image data is generated as low-resolution small image data by thinning out the essential image data. The essential image data and the thumbnail image data are recorded on the memory card 59 in association with each other.

The data management section 60 manages the image data recorded on the memory card 59 and includes a file management system. The data management section 60 keeps track of the attributes of the image data recorded on the memory card 59 (file name, file path, data size, etc.,) and generates an image information list T1 for managing the image data based on the attribute information. The generated image information list T1 is stored in the image information list storage section 61. The image information list storage section 61 is constructed in RAM, flash memory, etc., for example. The data management section 60 updates the image information list T1 based on the most recent storage configuration of the memory card 59 at one predetermined timing. The predetermined timing is described later; for example, the placing time of the memory card 59, the edit work time on the image data in the memory card 59, the print time based on the image data recorded on the memory card 59, etc., can be named.

The insertion/extraction detection section 62 checks whether or not the memory card 59 is placed in the card I/F 58. The insertion/extraction detection section 62 can detect the presence or absence of the memory card 59 based on change in the signal voltage of the I/F circuit. Alternatively, the insertion/extraction detection section 62 can also detect the presence of the memory card 59 by a mechanical switch. When detecting the memory card 59 being placed, the insertion/extraction detection section 62 notifies the data management section 60 that the memory card is placed. Upon reception of the notification, the data management section 60 accesses the memory card 59 and generates an image information list T1 based on the image data recorded on the memory card 59.

Figure 2:
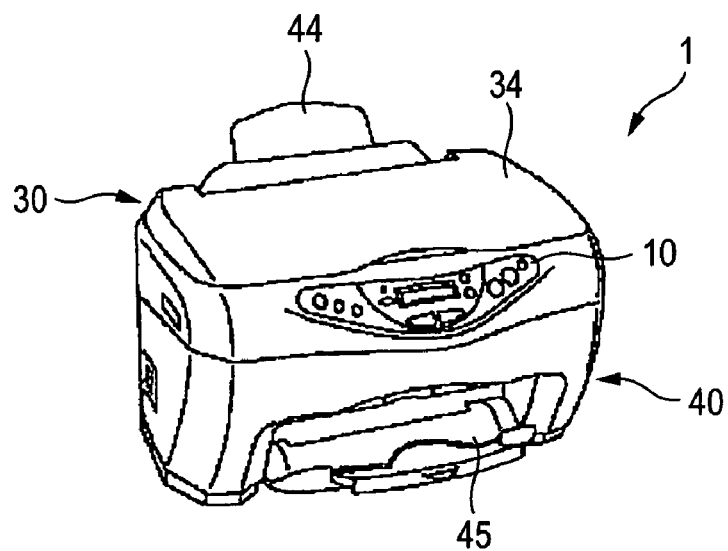
FIG. 2 is an appearance drawing in a state in which an original bed cover is closed.

Next, the appearance configuration of the printer 1 will be discussed with reference to FIGS. 2 and 3. FIG. 2 shows a state in which the original bed cover 34 is closed. The scan mechanism 30 is provided in the upper part of the printer 1, and the print mechanism 40 is provided in the lower part of the printer 1. The operation panel 10 is provided on the upper front of the printer 1. Further, the paper feed tray 44 is provided at the rear of the printer 1, and the paper ejection tray 45 is provided on the lower front of the printer 1. Thus, the printer 1 is implemented as a multifunction processing machine with the scan mechanism 30 and the print mechanism 40 contained in a single cabinet.

Figure 3:
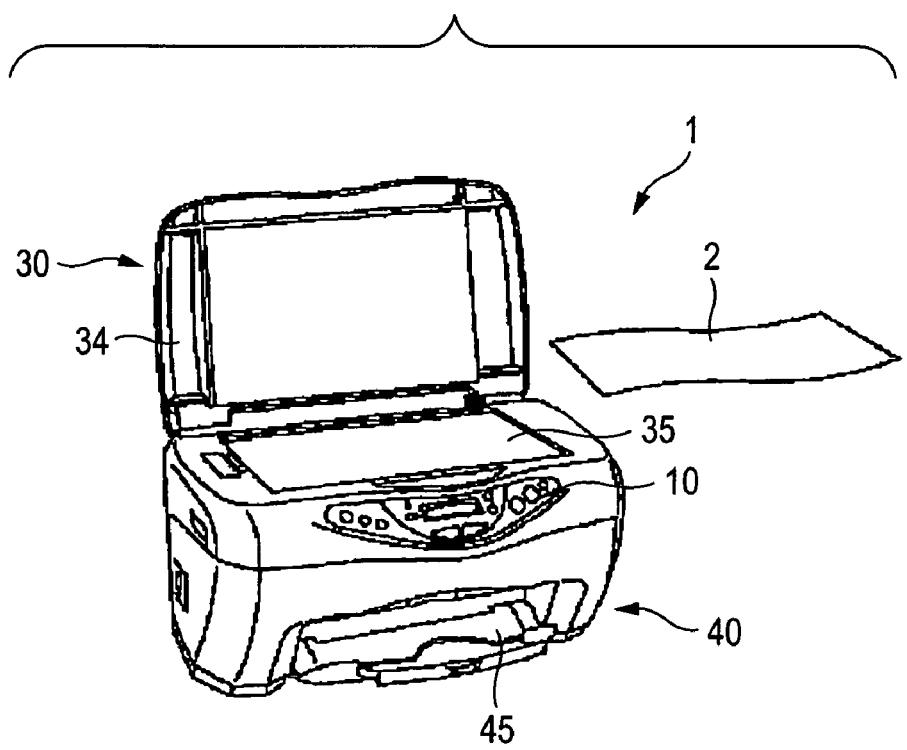
FIG. 3 is an appearance drawing in a state in which the original bed cover is open.

FIG. 3 shows a state in which the original bed cover 34 is open. When the original bed cover 34 is opened, the original bed 35 appears on the top of the printer 1. The original bed 35 is formed of a transparent glass material like a flat, and the light source 31, the light reception section 32, and the like are placed below the original bed 35. The user places an original 2 face down on the original bed 35 in register, closes the original bed cover 34, and enters a scan start command. Upon completion of reading the original, the user opens the original bed cover 34, removes the original 2 from the original bed 35, and places a new original 2 on the original bed 35. At the order sheet print time, the order sheet 64 with an image already selected by the user is placed face down on the original bed 35 and the sheet image is read.

Figure 4:
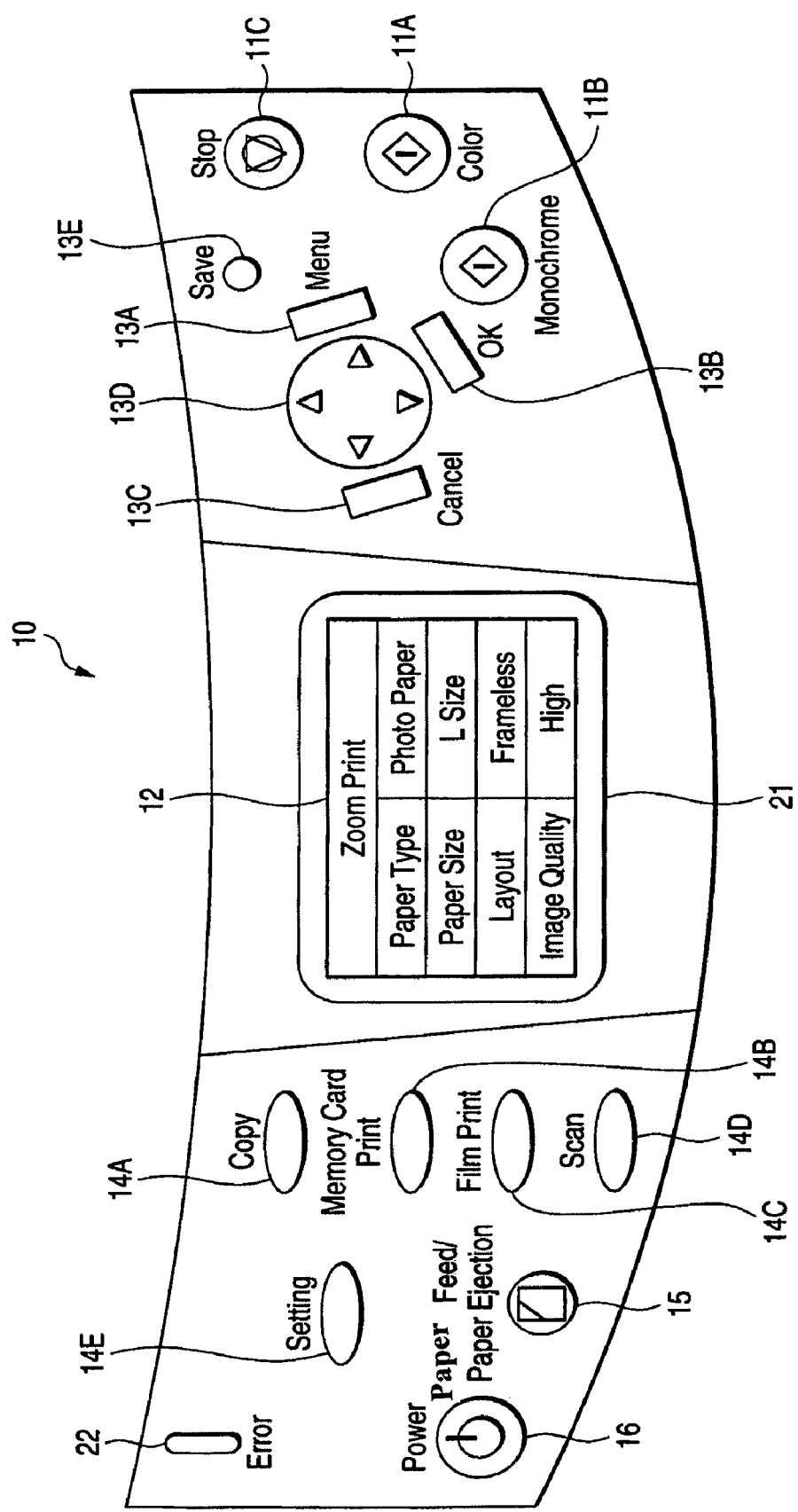
FIG. 4 is a schematic representation to show an example of an operation panel.

FIG. 4 is a schematic representation to show the appearance of the operation panel 10. The display 21 implemented as a liquid crystal display, for example, is provided in the center of the operation panel 10. The display 21 has a display capability of 7 rows×16 columns (full size mode), for example. Buttons 11A to 11C involved in execution command (start) and buttons 13A to 13E involved in menu operation are placed on one side of the display 21 (the right in the figure). Buttons 14A to 14E for selecting various processing modes that can be executed on a standalone basis, a paper feed/paper ejection button 15, a power button 16, and the above-mentioned error notification lamp 22 are placed on an opposite side of the display 21 (the left in the figure).

The functions of the buttons are as follows: The color copy button 11A is provided for entering a color copy execution command. The monochrome copy button 11B is provided for entering a monochrome copy execution command. The color copy button 11A and the monochrome copy button 11B provide both an execution command function for giving a copy operation start command and a selection function of selecting the type of image to be copied (color image or monochrome image). The stop button 11C is provided for terminating processing. The menu button 13A is provided for selecting a menu displayed on the display 21. The enter button 13B is provided for confirming the selected command descriptions. The cancel button 13C is provided for canceling the selected command descriptions. The cross key button 13D is provided for switching the display description of each item of the menu displayed on the display 21.

The printer 1 of the embodiment includes a plurality of processing modes such as local copy, memory card print, film print, scan, and scan to memory. The copy button 14A is provided for selecting local copy. The memory card print button 14 is provided for selecting the mode of reading image data from the memory card placed in the printer 1 and printing the image data. The film print button 14C is provided for selecting the mode of reading an image from a film such as a 35-mm film or a slide film, for example, and printing the image. The scan mode button 14D is provided for selecting the mode of recording the image read from an original on the memory card placed in the printer 1, transmitting the image to a host computer, etc. The setting button 14E is provided for performing contrast adjustment of the display 21, cleaning and nozzle check of the print head unit 41, detailed display of the ink remaining amount, ink cartridge replacement, etc. A mode selection button dedicated to the scan to memory can also be provided or the scan to memory function can also be called from the print menu 12.

The paper feed/paper ejection button 15 is provided for giving a paper feed operation command and a paper ejection operation command. The power button 16 is provided for controlling power supply to the printer 1. The lamp 22 is lighted when an error occurs, thereby alerting the user to the error.

Figure 5:
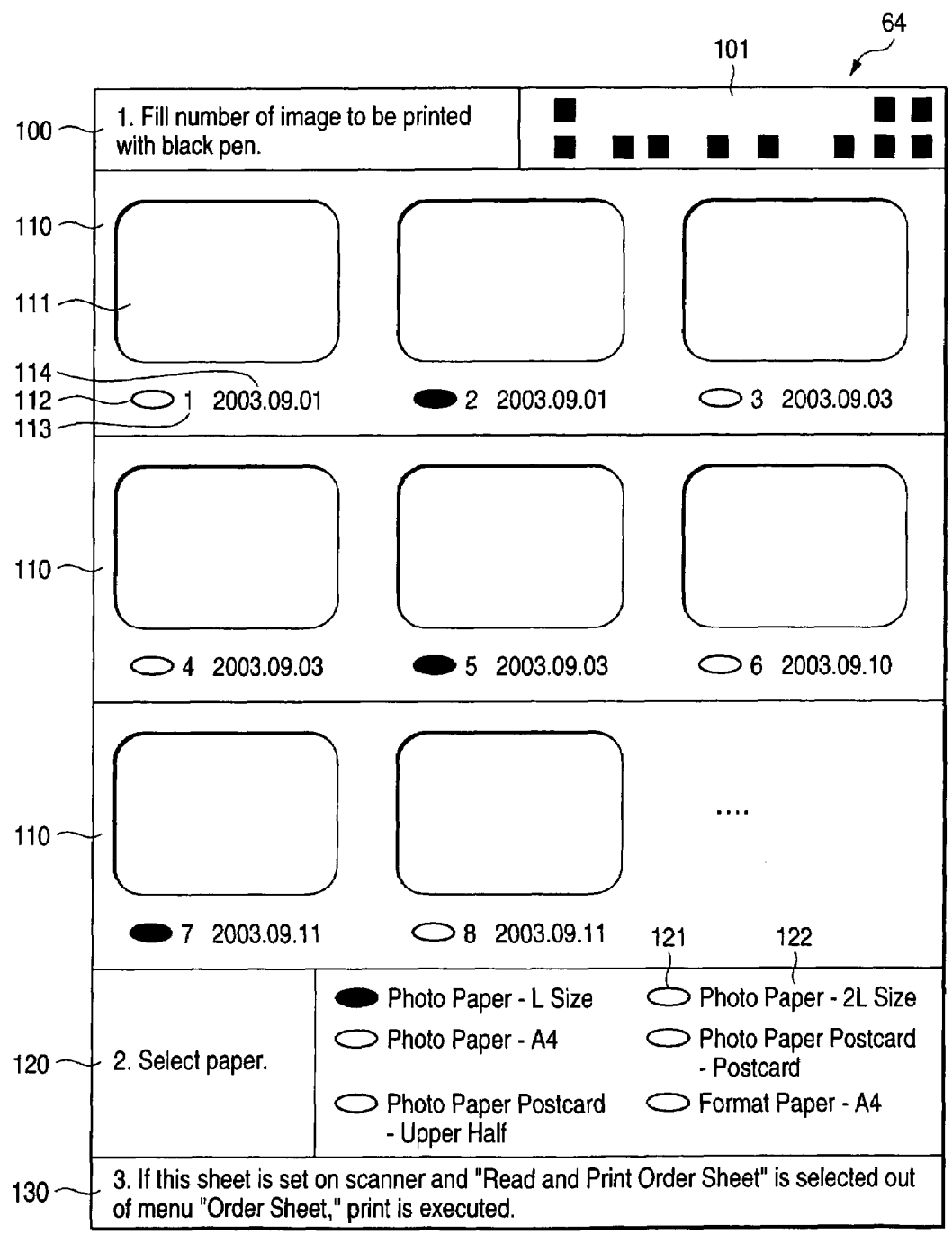
FIG. 5 is a schematic representation to show an outline of an order sheet.

FIG. 5 is a schematic representation to schematically show the format of the order sheet 64. The order sheet 64 is made up of a plurality of areas as described below: A first guide field 100 is provided for the top of the order sheet 64 for guiding the user in selecting any desired image. A check sum display field 101 is provided adjacent to the first guide field 100. The check sum value of the whole of each image data whose thumbnail image is printed on the order sheet 64 is printed in the check sum display field 101 as a symbol of a pattern of black quadrangles, for example. A comparison is made between the printed check sum value and the check sum value calculated in the printer 1, whereby whether or not the memory card 59 and the order sheet 64 correspond to each other can be determined.

A plurality of thumbnail display fields 110 are provided below the first guide field 100. Each thumbnail display field 110 displays a predetermined number of thumbnail images 111 (only one is denoted by the numeral). A mark part 112, a serial number 113, and a record date 114 are printed in association with each thumbnail image 111. The user fills the mark part 112 associated with each thumbnail image 111 with a pencil, a pen, etc., whereby the image data (essential image data) corresponding to the thumbnail image 111 is selected. In the figure, the second, fifth, and seventh images are selected.

A second guide field 120 is provided below the thumbnail display fields 110. The second guide field 120 is provided for guiding the user in specifying print paper. A mark part 121 for selecting paper and a plurality of paper types 122 are printed adjacent to the second guide field 120. The user can fill the mark part 121 corresponding to any desired type of print paper with a pen, etc., thereby specifying the print paper.

A third guide field 130 is provided at the bottom of the order sheet 64. The third guide field 130 is provided for guiding the user in starting print using the already marked order sheet 64. If much image data is recorded on the memory card 59, it is difficult to print all thumbnail images on one order sheet 64. In this case, a plurality of order sheets 64 are output and are given the page numbers to distinguish one order sheet 64 from another.

Figure 6:
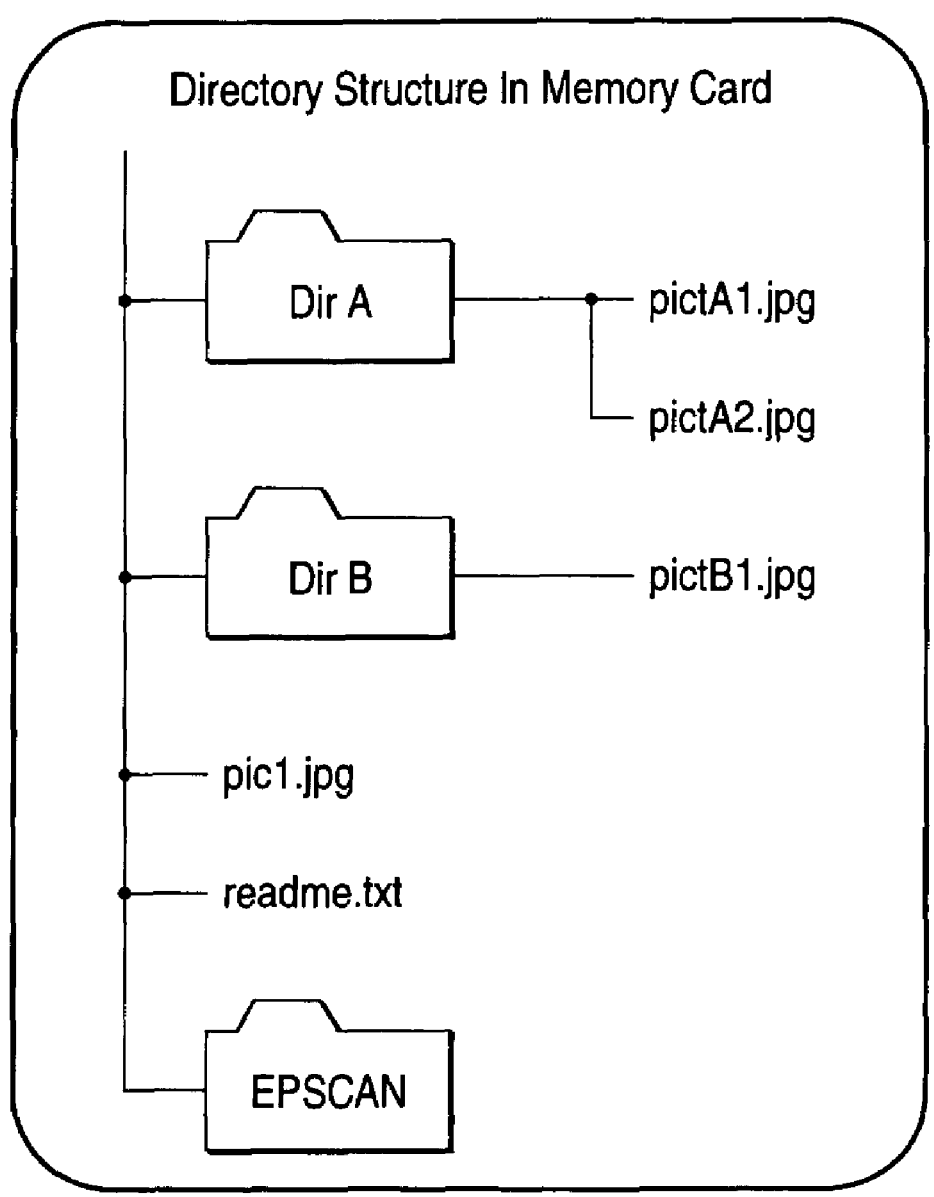
FIG. 6 is a schematic representation to show an outline of the directory structure of a memory card.

FIG. 6 is a schematic representation to show an outline of the directory structure in the memory card 59. A plurality of directories "Dir A," "Dir B," and "EPSCAN" can be formed in the memory card 59. A plurality of pieces of image data (also called files) "pictA1.jpg," "pictA2.jpg," "pictB1.jpg," etc., can be stored in the memory card 59. Data "readme.txt," etc., other than the image data can also be stored in the memory card 59. Only the image files of all files stored in the memory card 59 are extracted and registered in the image information list T1. The image data read from the scan mechanism 30 at the executing time of the "scan to memory function" is stored in the directory "EPSCAN." That is, the "EPSCAN" directory is a predetermined storage area for writing image data into an image record medium from an internal file system. The storage areas in the memory card 59 are roughly classified into a real data area for storing image data and a management area for storing management information for managing the stored image data. The management information can contain the file names, file paths, dates (photographing dates), etc., of the image data stored in the real data area, as known as FAT, etc., for example.

Here, as a method of generating the image information list T1 for the image data in the specific directory "EPSCAN" in which the scanned image data is stored, the following two methods can be named: The first method is a method of locating the position of the directory "EPSCAN" based on the management information of the memory card 59 (for example, FAT) and then acquiring necessary information from the header information of each piece of image data stored in the directory "EPSCAN." The second method is a method of acquiring the position of the directory "EPSCAN" based on the management information of the memory card 59 (for example, FAT) and information of the file names, the file paths, etc., of the image data stored in the directory "EPSCAN."

As a method of generating the image information list T1 for all directories in the memory card 59, the following two methods can be named: The first method is a method of acquiring all directories and the file names, the file paths, etc., of the image data existing in each directory based on the management information of the memory card 59 (for example, FAT). The second method is a method of acquiring the header information about all image data stored in the memory card 59.

Figure 7:
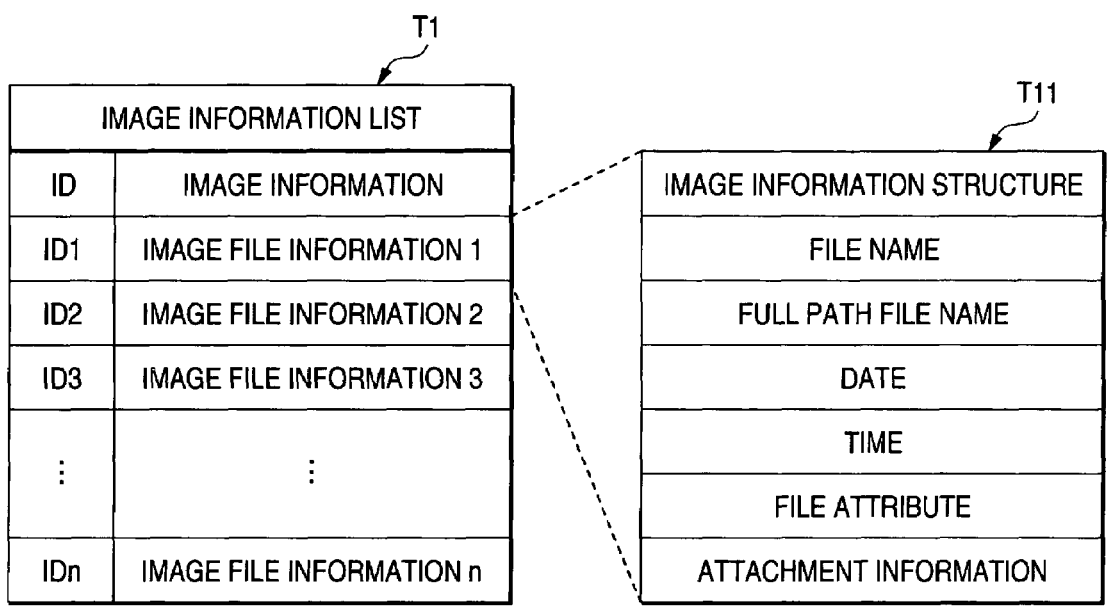
FIG. 7 is a schematic representation to show the structure of an image information list.

FIG. 7 is a schematic representation to show the structure of the image information list T1 generated by the data management section 60 and stored in the image information list storage section 61. The image information list T1 is information (or an image management table) for the printer 1 to internally manage the image data recorded on the memory card 59. The image information list T1 is made up of identification codes (IDs) and image file information associated with the identification codes. The identification codes uniquely defined in the memory card 59 are provided in a one-to-one correspondence with the pieces of image data stored in the memory card 59. The pieces of image file information are provided in a one-to-one correspondence with the pieces of image data. Each piece of image file information is provided by an image information structure T11.

The image information structure T11 is a small table listing various pieces of attribute information of image data. The image information structure T11 is made up of the file name of the image data, the full path file name for accessing the image data in the memory card 59, the record date and time, the file attribute, and miscellaneous attached information, for example. Therefore, if the image information list T1 is searched with the identification code as a search key, the image information structure T11 corresponding to the identification code can be called and can be referenced, thereby keeping track of the file name, the storage location, etc., of any desired image data.

Figure 8:
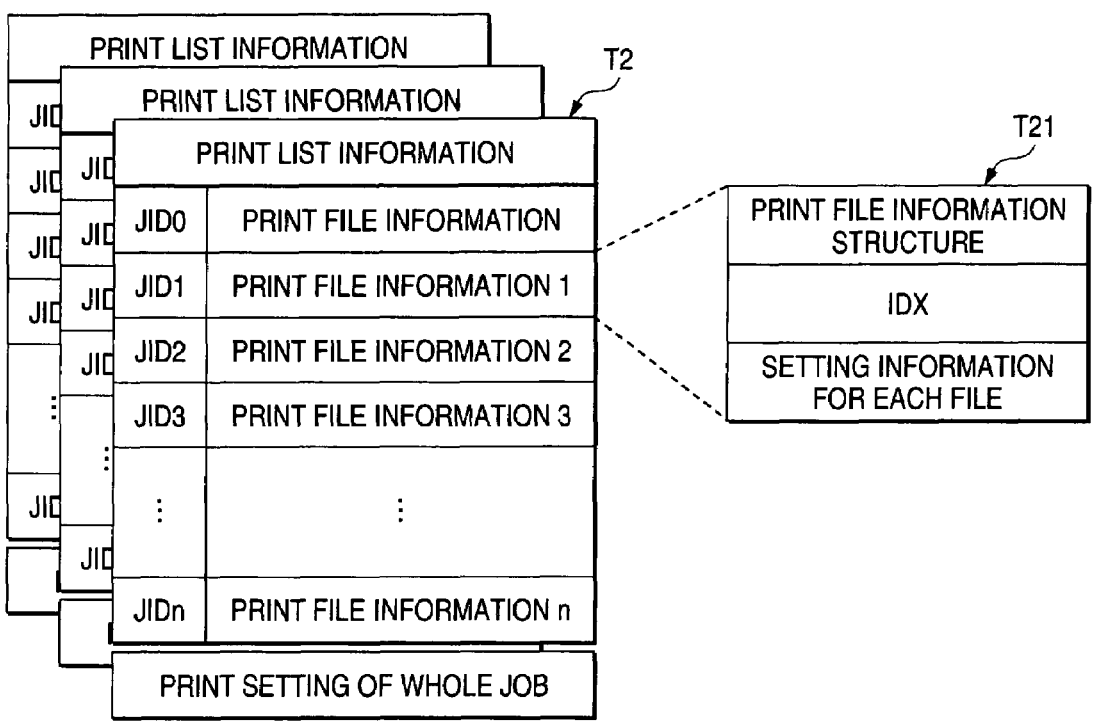
FIG. 8 is a schematic representation to show the structure of print list information.

FIG. 8 is a schematic representation to show the structure of print list information T2. The print list information T2 is referenced, whereby the image data described therein is read from the memory card 59 and print data is generated based on the read image data. The print list information T2 is made up of identification codes (JIDs), print file information associated with the identification codes, and print setting information applied to the whole print job, for example. Each piece of print file information is provided by a print file information structure T21. The print file information structure T21 is made up of a print image identification code (IDX) and setting information for each file. To perform usual memory card print, the identification code of the image information list T1 is set in the IDX. Therefore, the image information list T1 is searched based on the IDX of the print file information structure T21, whereby the image data to be printed can be determined and can be read from the memory card 59. As described later, if an image information sublist T3 is provide, subID is set in the IDX. The setting information for each file indicates print setting information for each file, such as tint at the print time, etc. The print setting information of the whole print job contains paper size specification, layout, the presence or absence of rotation processing, etc., for example.

Figure 9:
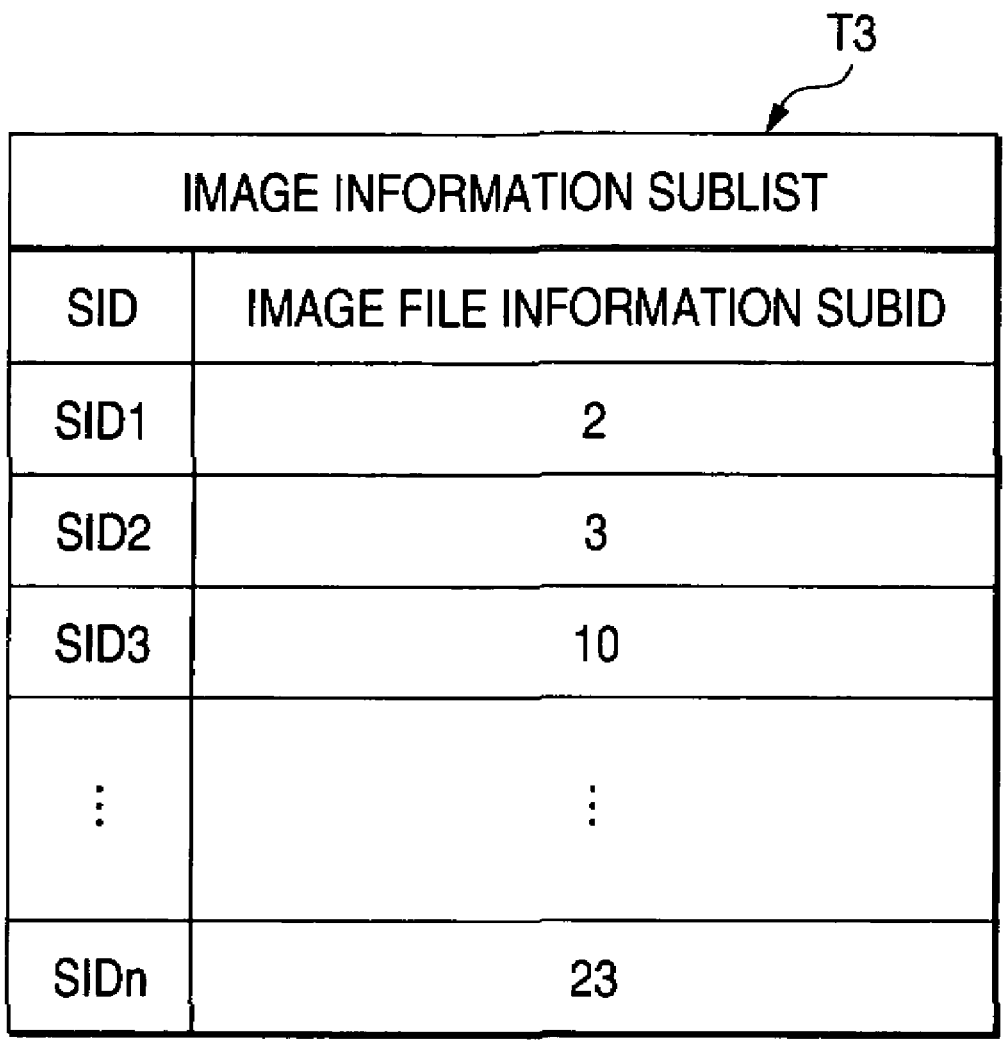
FIG. 9 is a schematic representation to show the structure of an image information sublist.

FIG. 9 is a schematic representation to show the structure of the image information sublist (simply, sublist) T3. The sublist T3 is used to extract only the image data recorded in a specific time period or on a specific date for print or to extract only the image data stored in a specific folder for print. The sublist T3 is made up of identification codes (SIDs) and image file information subIDs (simply, subIDs). Here, the identification code SID of the sublist T3 simply indicates the order. The identification code of the image information list T1, namely, the identification code to identify the target image data is set in the subID. If the sublist T3 is generated, the subID is set in the IDX of the print file information structure T21. Therefore, if the sublist T3 is provided to print only one specific image data group, the subID of the sublist T3 is drawn out based on the IDX read from the print list information T2 and the image information list T1 is searched based on the subID, whereby information of the target image data can be obtained. As the sublist T3 is made to intervene between the image information list T1 and the print list information T2, images can be printed under various conditions (time period, folder name, etc.,) in addition print according only to the order conforming to the ASCII code (ASCII sort order). To perform order sheet print, the sublist T3 can also be used to extract only the marked images on the order sheet 64 for print.

Figure 10:
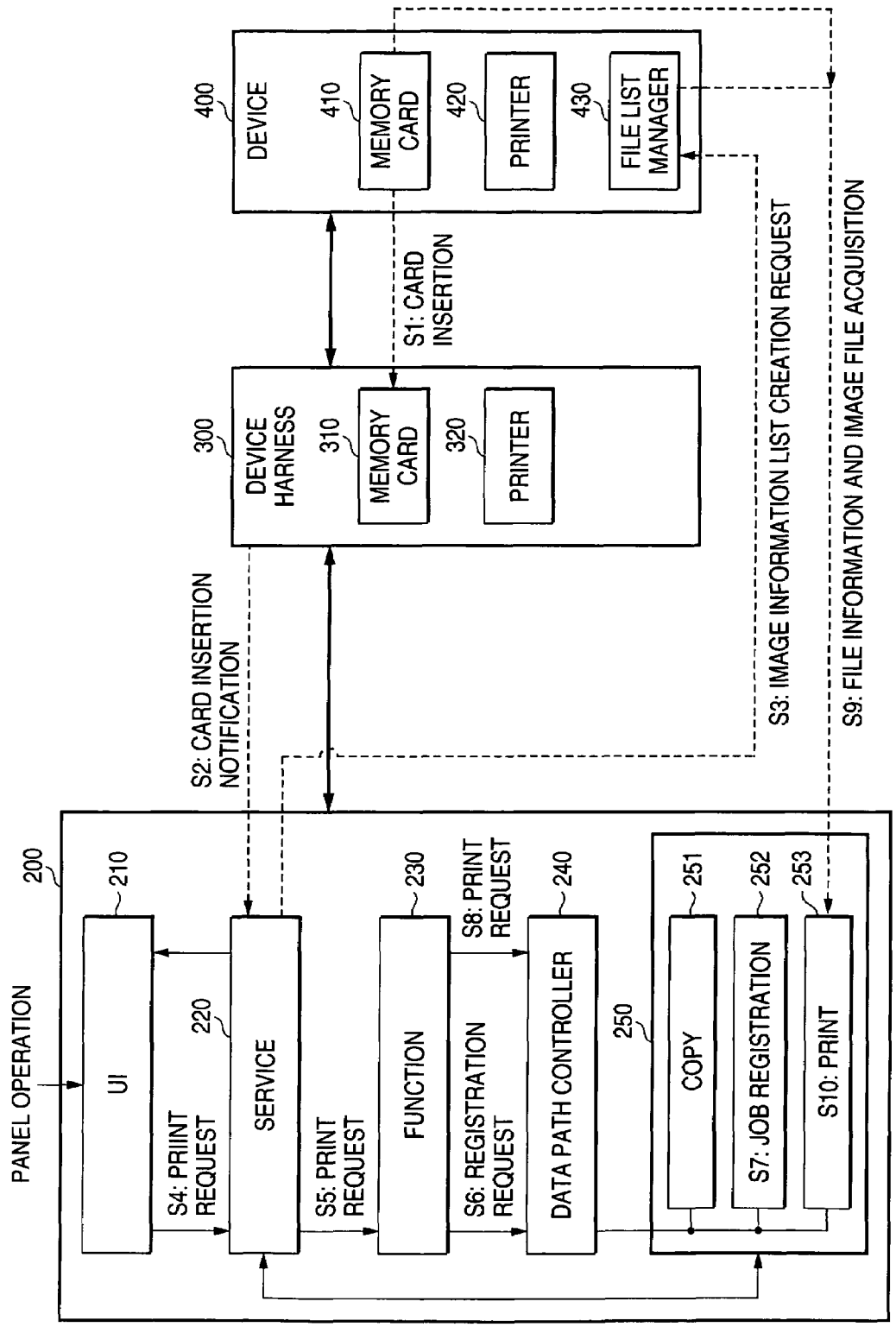
FIG. 10 is a schematic representation to show the schematic configuration of firmware of the printer and a processing outline when a memory card is placed in the printer.

FIG. 10 is a block diagram with attention focused on the firmware structure of the printer 1. Firmware 200 can be made up of a UI layer taking charge of a user interface (UI), a service layer 220, a function layer 230, a data path controller (DPC), and a data path 250, for example.

The UI layer 210 accepts information entered by the user through the operation panel 10 or provides information for the user. The service layer 220 plays an initiative role in executing various modes. The service layer 220 transfers the information input from the UI layer 210 to the function layer 230. The service layer 220 sends various responses and notifications to the UI layer 210. The function layer 230 is provided for each function of each print mode. The function layer 230 interprets a request input from the service layer 220, converts the request into an executable command, and transfers the command to the DPC 240. The DPC 240 passes the request input from the function layer 230 to a predetermined data path. For example, a copy path 21, a job registration path 252, and a print path 253 can be named as the data paths.

A device harness 300 causes the firmware 200 to logically recognize a physical device 400. The device 400 can include a memory card device 410, a printer device 420, and a file list manager 430, for example. The memory card device 410 corresponds to the memory card 59. The printer device 420 corresponds to the printer function of the printer 1. The device harness 300 can be provided with a memory card device harness 310 and a printer device harness 320, for example. The memory card device harness 310 corresponds to the memory card device 410 and the printer device harness 320 corresponds to the printer device 420. The file list manager 430 creates or deletes an image information list T1 in accordance with a request from the service layer 220.

A flow of placing a memory card 59 in the printer 1, calling the image data stored on the memory card 59, and printing the image data will be discussed with reference to FIG. 10. First, when the memory card 59 is placed in the printer 1, a notification is sent from the physically existing memory card device 410 to the logically existing memory card device harness 310 (S1). The memory card device harness 310 notifies the service layer 220 that a card insertion event occurred (S2). Upon reception of the notification that a card insertion event occurred, the service layer 220 requests the file list manager 430 to create an image information list T1 (S3). The file list manager 430 searches for image data stored in the memory card 59 in response to the instruction from the service layer 220 and generates an image information list T1. The generated image information list T1 is stored in the image information list storage section 61.

The user selects the image data stored on the memory card 59 and enters a print condition through the operation panel 10. Then, the user enters a print execution command of the image data as specified. The user-entered command is input to the service layer 220 through the UI layer 210 (S4). The service layer 220 inputs a print request to a predetermined function layer 230 (in this case, function layer for memory card print) (S5). The function layer 230 requests the DPC 240 to register a print job (S6). Upon reception of the print job registration request, the DPC 240 causes the job registration data path to register anew print job (S7). When the print job is registered and is placed in a queue, the DPC 240 requests the print data path 253 to start print (S8). The print data path 253 acquires the image data to be printed and file information concerning the image data from the file list manager 430 and the memory card device 410 (S9) and starts print (S10).

Figure 11:
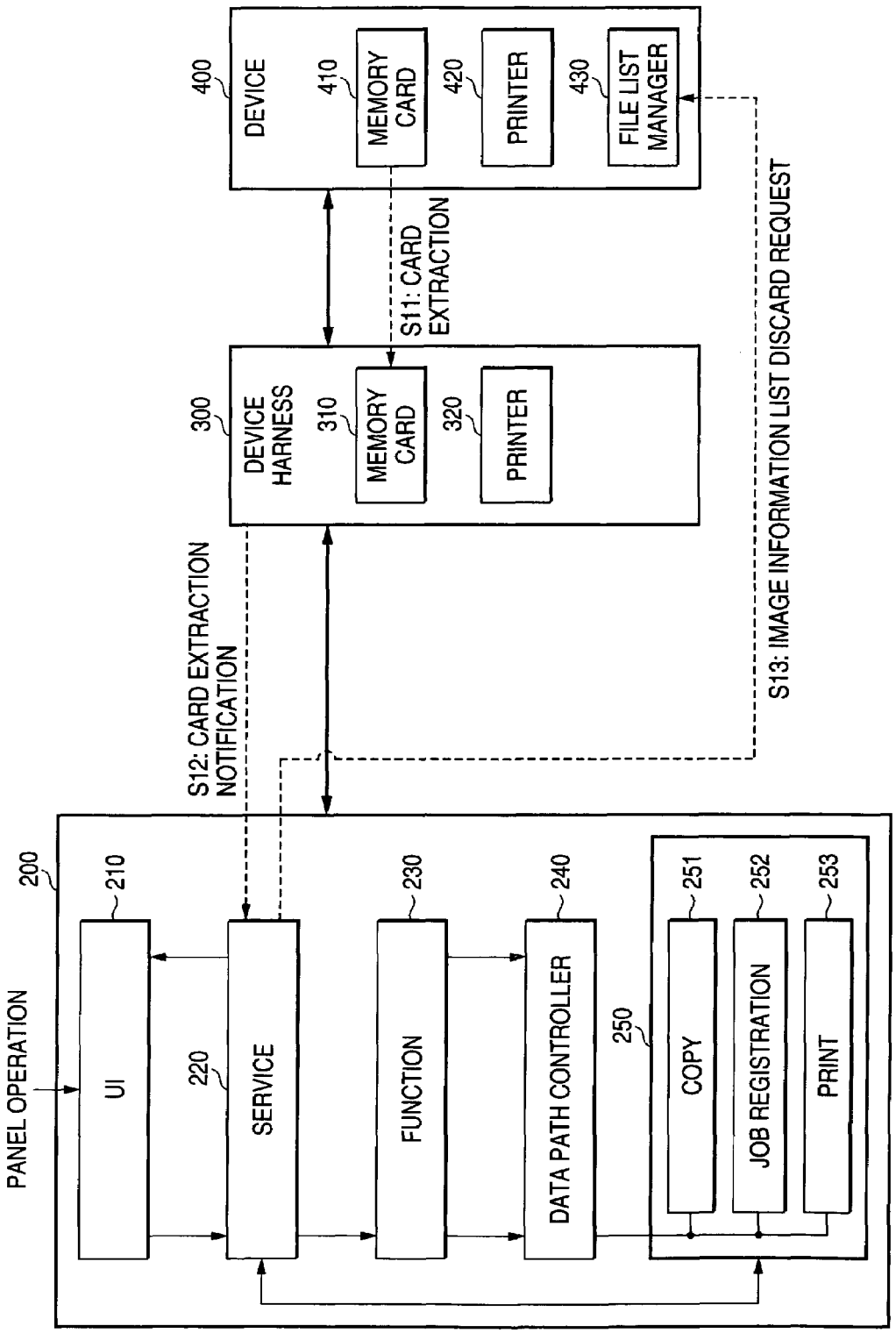
FIG. 11 is a schematic representation to show a processing outline when a memory card is removed from the printer

A processing outline when the memory card 59 is removed from the printer 1 will be discussed with reference to FIG. 11. If the user removes the memory card 59 from the printer 1, a notification that the memory card 59 has been removed is sent from the memory card device 410 to the memory card device harness 310 (S11). The memory card device harness 310 notifies the service layer 220 that the memory card 59 has been removed (S12).

Upon reception of the notification that a card extraction event occurred, the service layer 220 requests the file list manager 430 to discard the image information list T1 (S13). The file list manager 430 discards the image information list T1 stored in the image information list storage section 61.

Figure 12:
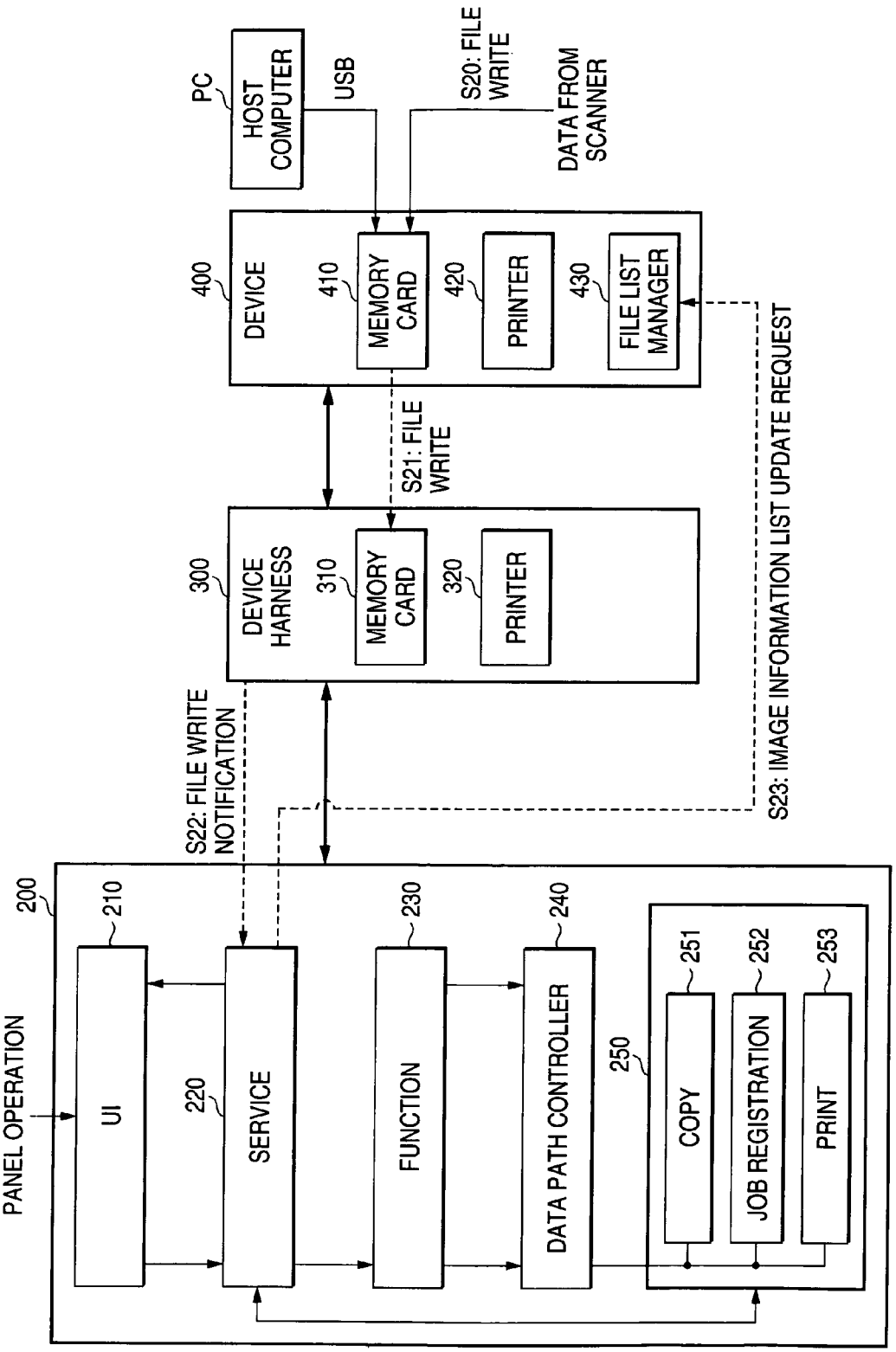
FIG. 12 is a schematic representation to show a processing outline for updating an image information list.

A processing outline for updating the image information list T1 will be discussed with reference to FIG. 12. The printer 1 contains the scan mechanism 30 as described above and can be connected to the host computer PC. Image data can be written onto the memory card 59 placed in the printer 1 from the scanner function in the printer and the host computer PC outside the printer 1. However, the scanner function in the printer (internal file system) and the host computer PC outside the printer 1 (external file system) cannot access the memory card 59 at the same time and only either can access the memory card 59 (exclusive control of access).

For example, when image data (image file) is written onto the memory card 59 from either the scanner function in the printer or the host computer PC (S20), the memory card device 410 detects the file write and notifies the memory card device harness 310 that the file has been written (S21). The memory card device harness 310 sends a notification that a file write event occurred to the service layer 220 (S22).

When a predetermined timing comes after reception of the notification that a file write event occurred, the service layer 220 requests the file list manager 430 to update the image information list T1 (S23). That is, occurrence of the file write event and updating of the image information list T1 do not synchronize with each other and updating of the image information list T1 is executed asynchronously. In other words, detection of the file write event is predicated on updating the image information list T1, and the coming of the predetermined timing is the update execution condition of the image information list T1. The timing at which a print start instruction is given based on the image data stored on the memory card 59, for example, as described later can be named as the predetermined timing.

Figure 13:
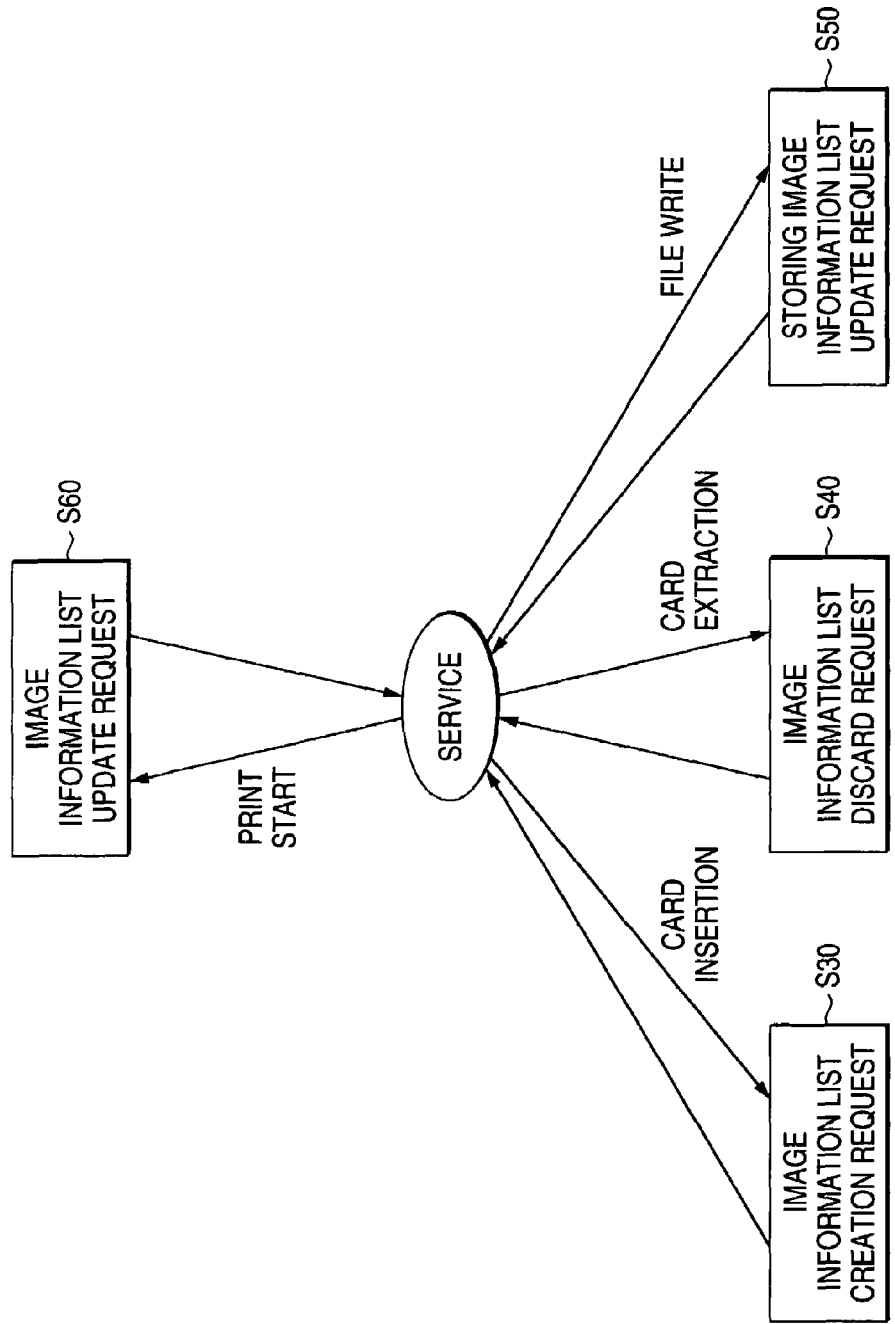
FIG. 13 is a schematic representation to show an outline of whole processing of a service layer.

FIG. 13 is a schematic representation to show an outline of processing executed by the service layer 220 for the image information list T1. When the memory card 59 is placed in the printer 1 and the card I/F 58 and the memory card 59 are connected, the service layer 220 requests the file list manager 430 to create an image information list T1 (S30). When the memory card 59 is removed from the printer 1 and the memory card 59 and the card I/F 58 are disconnected, the service layer 220 requests the file list manager 430 to discard the image information list T1 (S40). Further, when image data is written onto the memory card 59 from the scanner function in the printer or the host computer PC, the service layer 220 stores a request to be made for updating the image information list T1 (S50). The image information list T1 is not yet updated at this point in time. When the user enters a print start command of the image data stored on the memory card 59, the service layer 220 requests the file list manager 430 to update the image information list T1 (S60).

The creation processing of the image information list T1 (S30), the update request storage processing of the image information list T1 (S50), and the update request processing of the image information list T1 (S60) are described later in detail. The discard processing of the image information list T1 (S40) is only to discard the image information list T1 stored in the image information list storage section 61 and therefore is not described in detail.

Next, a processing outline of the function layer 230 and the device harness 300 is described before the processing of the service layer 220 is described in detail.

Figure 14:
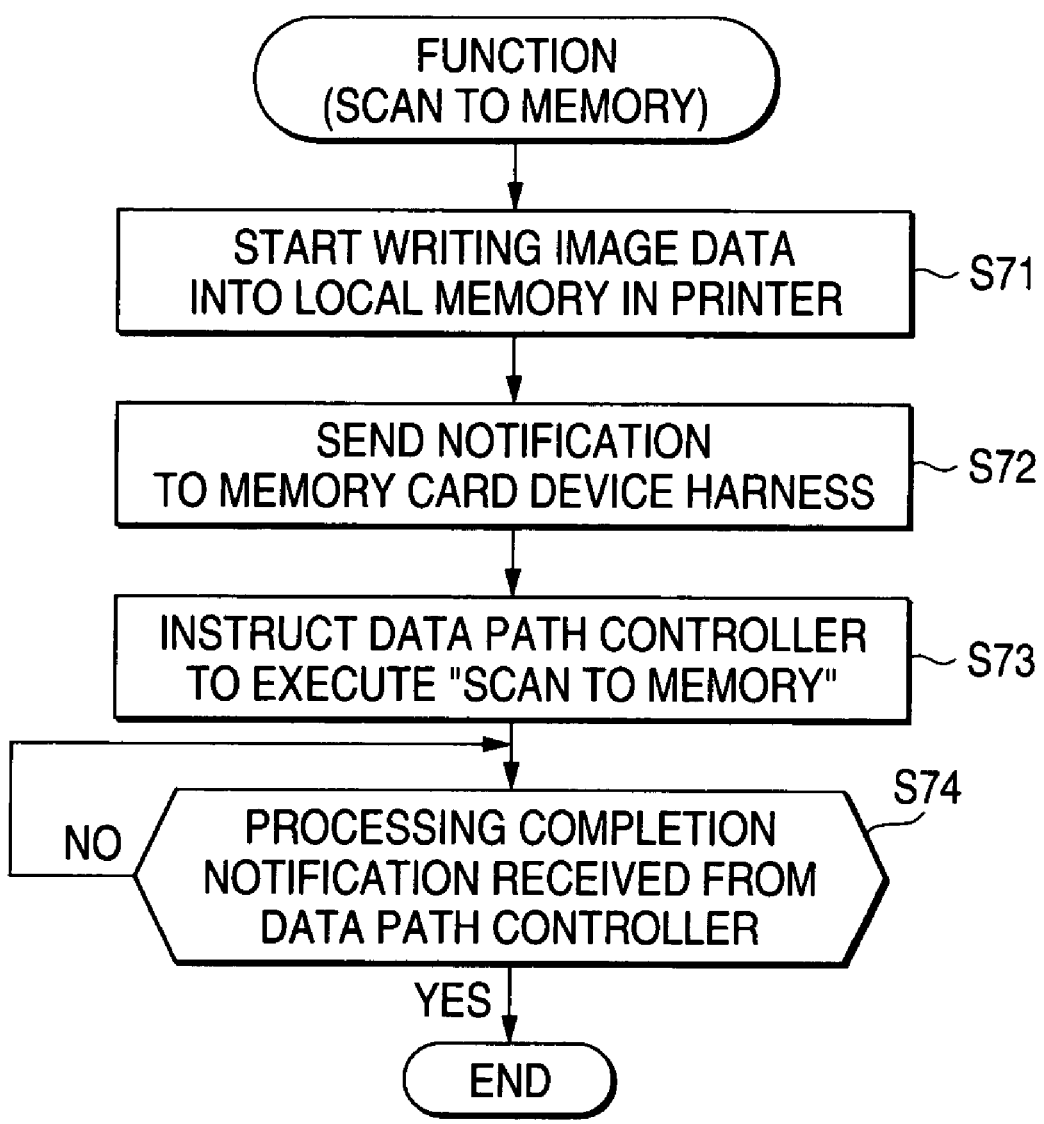
FIG. 14 is a flowchart to show a processing outline of a function layer.

FIG. 14 is a flowchart to show schematic processing of the function layer 230 for executing the "scan to memory function." When the user specifies the "scan to memory function," the "scan to memory function" function layer 230 is called and is started. First, the scanner function in the printer acquires the access right to local memory (RAM, etc.,) of the printer 1, locks the memory, and starts to write the image data read by the scan mechanism 30 into the local memory (S71) The local memory functions as a data buffer for writing the scanned image data into a predetermined area of the memory card 59 (direction "EPSCAN").

The memory card device harness 310 is notified that writing the scan data into the local memory is started (S72). Next, the function layer 230 instructs the DPC 240 to execute the "scan to memory function" (S73). The DPS 240 issues an instruction to a predetermined data path, thereby executing the "scan to memory function." When storing the scan data on the memory card 59 is complete and a processing completion notification is received from the DPC 240 (YES at S74), the function layer 230 terminates the processing.

Figure 15:
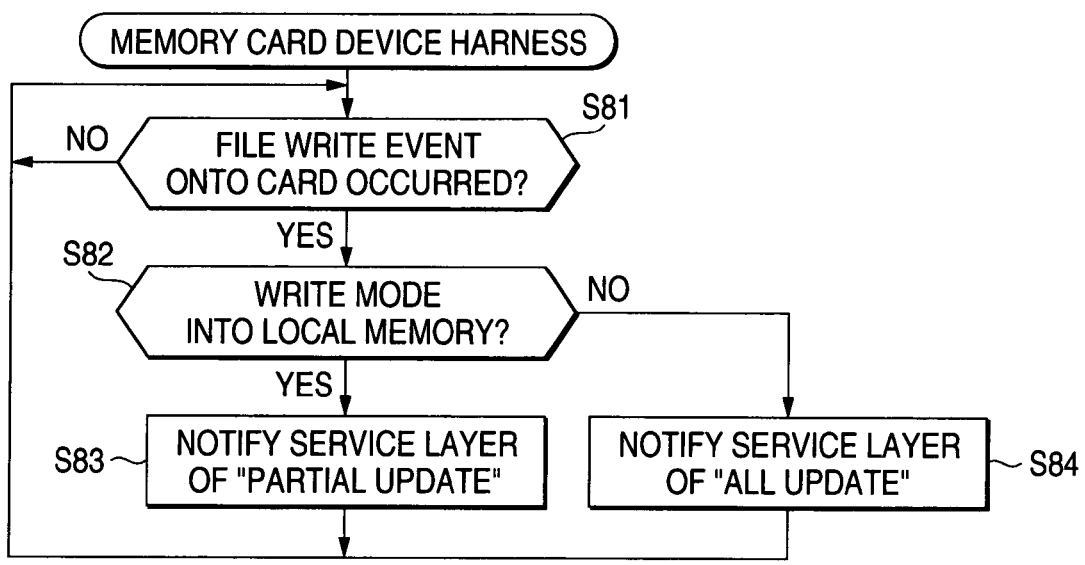
FIG. 15 is a flowchart to show a processing outline of a memory card device harness.

Next, FIG. 15 is a flowchart to show schematic processing of the memory card device harness 310. The memory card device harness 310 determines whether or not a file write event onto the memory card 59 occurred based on the notification from the memory card device 410 (S81). If a file write event occurred (YES at S81), the memory card device harness 310 determines whether or not the file write event is a file write event into the local memory by the scanner function (S82).

If notification of file write into the local memory is sent from the function layer 230 to the memory card device harness 310 at S72 in FIG. 14 (YES at S82), a write mode by the internal file system (which can also be called local mode) is applied. To write image data onto the memory card 59 by the "scan to memory function," the image data is stored in the predetermined directory "EPSCAN" previously specified, as described above. The image data written onto the memory card 59 by the scanner function in the printer exists only in the predetermined directory "EPSCAN" and is not written into any location other than the directory.

Therefore, an image information list T1 can be obtained by handling only the predetermined directory "EPSCAN." For example, management information concerning the predetermined directory "EPSCAN" is acquired from the management area in the memory card 59, whereby the image information list T1 based on the most recent state after the termination of the "scan to memory function" can be obtained. Alternatively, the header information of the image data stored in the predetermined directory "EPSCAN," the image information list T1 can be obtained.

That is, as described above, the management information in the memory card 59 (for example, FAT) is consulted to determine only the position of the directory "EPSCAN" and the header information of the image data stored in the directory "EPSCAN" is consulted to acquire the file names, the file paths, etc., whereby the image information list T1 can be obtained. Alternatively, the position of the directory "EPSCAN" and the file names, the file paths, etc., of the image data stored in the directory "EPSCAN" are acquired based on the management information in the memory card 59 (for example, FAT), whereby the image information list T1 can be obtained. Either method may be adopted.

Then, the memory card device harness 310 notifies the service layer 220 of "partial update" indicating that only the predetermined directory in the entire directory structure of the memory card 59 has been updated (S83).

In contrast, if the image data is written onto the memory card 59 from the host computer PC (NO at S82), the printer 1 cannot understand which directory of the memory card 59 the host computer PC writes the image data into, because the host computer PC can directly access the memory card 59 through the external I/F 63 and write image data onto the memory card 59. Therefore, if the host computer PC writes image data onto the memory card 59, where the image data is stored in the storage area of the memory card 59 is unknown and thus all directories of the memory card 59 are handled, whereby the image information list T1 based on the most recent state after the image data is written by the host computer PC can be obtained. Then, the memory card device harness 310 notifies the service layer 220 of "all update" indicating that the image information list T1 should be updated by handling all directories of the memory card 59 (S84).

Figure 16:
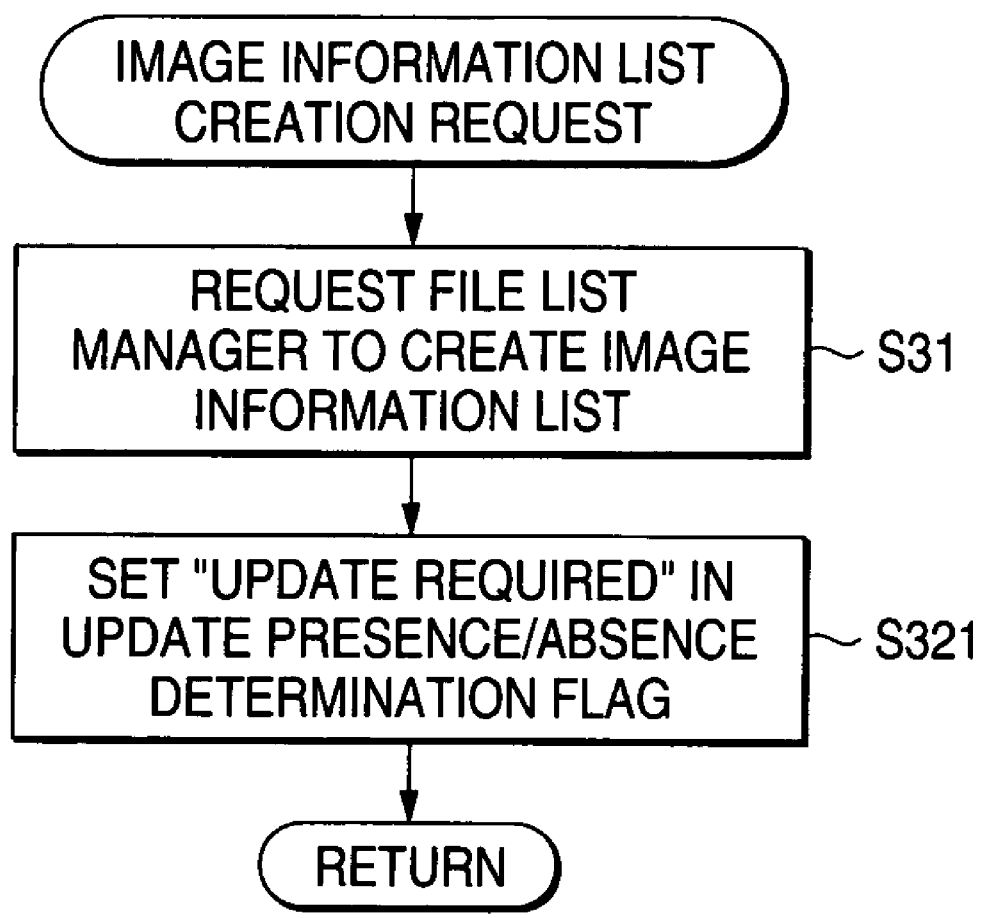
FIG. 16 is a flowchart to show image information list creation request processing.

Next, FIG. 16 is a flowchart to show an outline of the image information list creation request processing in FIG. 13. The image information list creation request processing is executed when a memory card 59 is placed in the printer 1. First, the service layer 220 requests the file list manager 430 to create an image information list T1 (S31) and next sets "update required" in an update presence/absence determination flag and returns to the main routine (S32).

Figure 17:
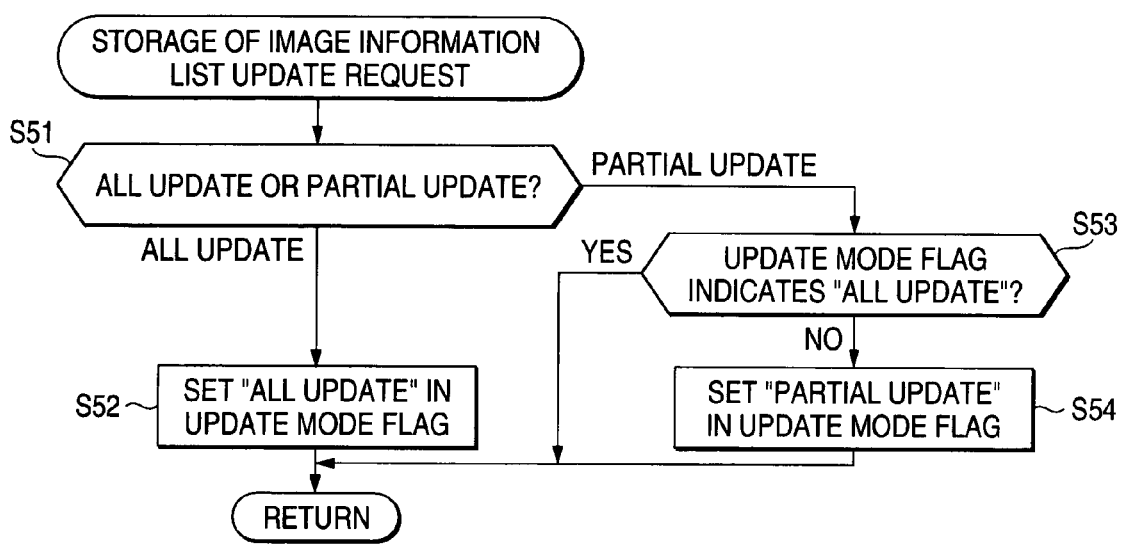
FIG. 17 is a flowchart to show storage processing of an image information list update request.

FIG. 17 is a flowchart to show an outline of the storage processing of image information list update request in FIG. 13. In the processing, first whether the service layer 220 is notified of "all update" or "partial update" is determined based on the notification from the memory card device harness 310 (S83 or S84 in FIG. 15) (S51). If the service layer 220 is notified of "all update," image data is written into any area of the memory card 59 by the post computer PC and the location of the new written image data is unknown. Then, the service layer 220 sets "all update" in an update mode flag and returns to the main routine (S52).

In contrast, if the notification from the memory card device harness 310 indicates "partial update," image data is written into the predetermined directory "EPSCAN" by the scanner function in the printer. Therefore, if the predetermined directory "EPSCAN" only is handled, an image information list T1 on which the most recent state of the memory card 59 is reflected can be obtained.

Next, the service layer 220 checks the update mode flag and determines whether or not "all update" is already set in the update mode flag (S53). If "all update" is not set in the update mode flag (NO at S53), the service layer 220 sets "partial update" in the update mode flag (S54). The purpose of checking the update mode flag although the notification from the memory card device harness 310 indicates "partial update" is to consider the case where image data is first written onto the memory card 59 from the host computer PC and then different image data is written onto the memory card 59 by the "scan to memory function." In this case, if the determination step of S53 does not exist, the memory card device harness 310 notifies the service layer 220 of "partial update" because of the "scan to memory function" later executed. Therefore, the file list manager 430 handles only the predetermined directory "EPSCAN" (for example, again searches) and generates an image information list T1, and the presence of the image data written by the host computer PC is not reflected on the image information list T1. Then, in the embodiment, even if image data is written onto the memory card 59 by the internal file system (or even if the location where the image data is written is known), whether or not image data is written onto the memory card 59 by the external file system or whether or not operation is added in such a manner that the location where the image data is written is unknown is determined before the image information list T1 is updated, so that the reliability of the image information list T1 is enhanced.

Figure 18:
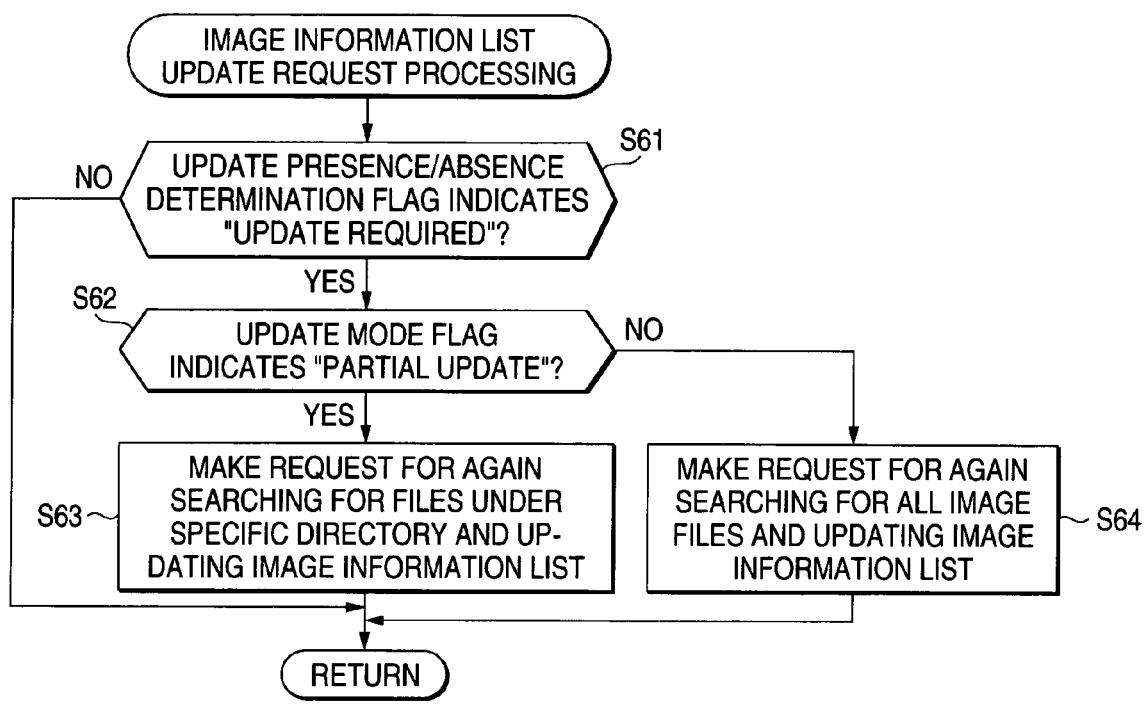
FIG. 18 is a flowchart to show image information list update request processing.

FIG. 18 is a flowchart to show an outline of the image information list update request processing in FIG. 13. The service layer 220 first determines whether or not "update required" is set in the update presence/absence determination flag (S61). The update presence/absence determination flag is information indicating whether or not the image information list T1 needs to be updated. If "update required" is not set in the update presence/absence determination flag (NO at S61), the service layer 220 exits the processing and returns to the main routine.

On the other hand, if "update required" is set in the update presence/absence determination flag (YES at S61), the service layer 220 determines whether or not "partial update" is set in the update mode flag (S62). If "partial update" is set in the update mode flag, the service layer 220 requests the file list manager 430 to handle only the predetermined directory "EPSCAN" previously specified and generate an image information list T1 (S63), and returns to the main routine. In contrast, if "partial update" is not set in the update mode flag (NO at S62), namely, "all update" is set in the update mode flag, the service layer 220 requests the file list manager 430 to handle all directories in the memory card 59 and generate an image information list T1 (S64), and returns to the main routine.

Figure 19:
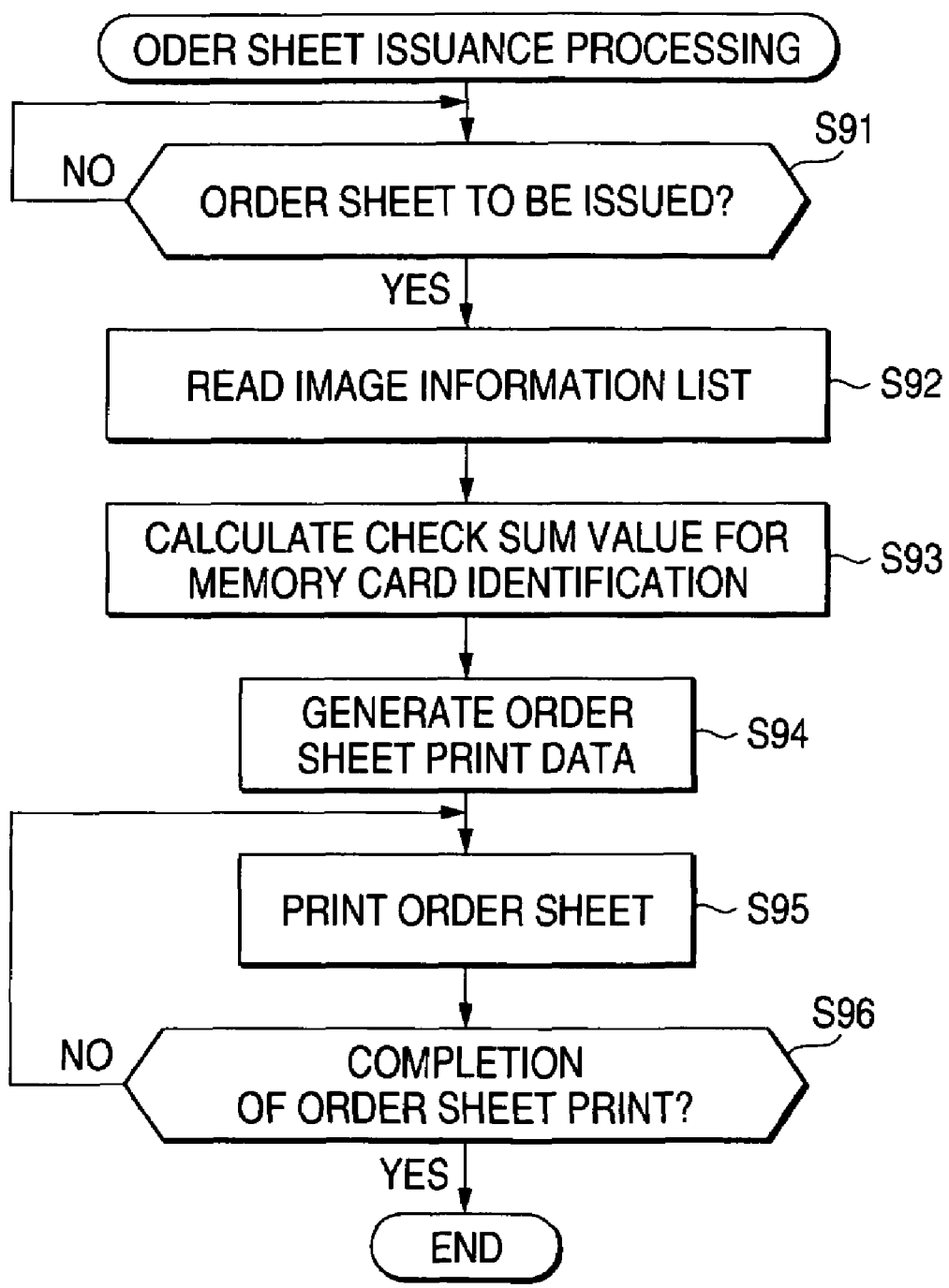
FIG. 19 is a flowchart to show order sheet issuance processing.

Next, FIG. 19 is a flowchart to show order sheet issuance processing. First, whether or not the user selects order sheet print out of the print menu 12 and enters an order sheet issuance command is determined (S91). If the user makes a request for issuing an order sheet (YES at S91), the order sheet issuance section 51 reads the image information list T1 from the image information list storage section 61 (S92) and calculates the check sum value for memory card identification (S93). The order sheet issuance section 51 passes the data required for order sheet issuance (check sum value, path information to acquire thumbnail images, etc.,) to the image processing section 55, which then generates order sheet print data based on that data (S94). The image processing section 55 may generate order sheet print data by directly referencing the image information list T1. When the order sheet print data is generated, the printer control section 57 controls driving the print mechanism 40, thereby printing an order sheet 64 (S94). If a plurality of order sheets 64 are issued, print is performed until completion of printing all pages (S96).

Figure 20:
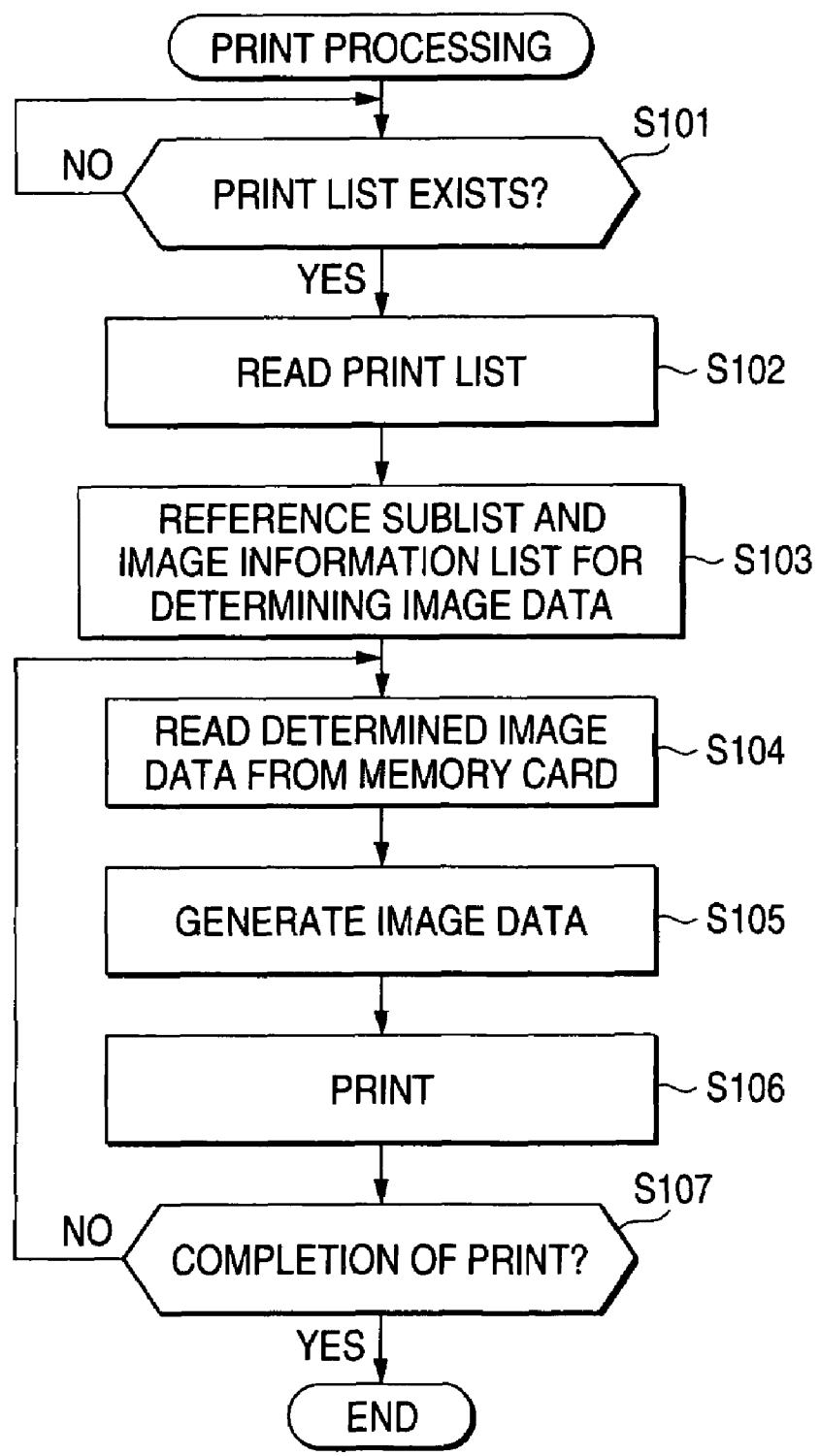
FIG. 20 is a flowchart to show print processing.

FIG. 20 is a flowchart to show print processing. First, the image processing section 55 determines whether or not print list information T2 exists (S101). If print list information T2 exists (YES at S101), the print list information T2 is read (S102) and the sublist T3 and the image information list T1 are referenced for determining the image data to be printed (S103). The image processing section 55 (or the order sheet analysis section 52) reads the image data selected by the user from the memory card 59 (S104) and generates print data based on the read image data (SLOS). This print data is stored in the print image data storage section 56 and is printed by the printer control section 57 (S106). Reading the image data and generating and printing the print data are repeated until the image data selected by the user is all printed on the user-specified print paper (S107).

Figure 21:
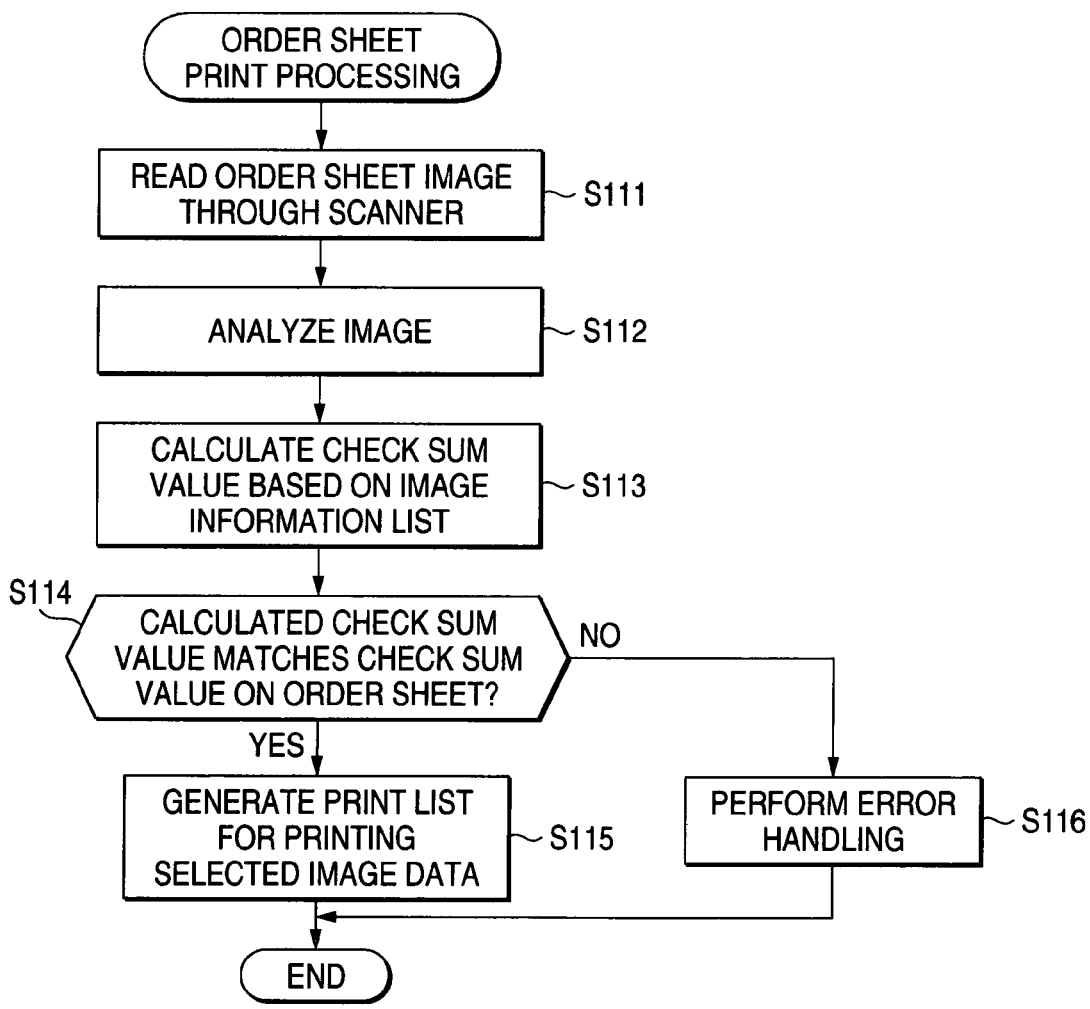
FIG. 21 is a flowchart to show order sheet print processing.

FIG. 21 shows order sheet print processing. Before this processing is started, the user appropriately marks the mark parts 112 and 121 of the order sheet 64, thereby selecting the image to be printed and the print method (paper type). The user places the order sheet 64 with the entries already selected on the original bed 35, closes the original bed cover 34, and enters a read command of the order sheet 64 out of the print menu 12.

When the user enters an image read command, the sheet image of the order sheet 64 is read, for example, as a monochrome binary image through the scan mechanism 30 (S111). The order sheet analysis section 52 analyzes the contents of the sheet image, for example, using an image analysis technique such as pattern matching (S112) and detects which image the user selects and which type of paper print the user selects. The order sheet analysis section 52 also restores the check sum value printed as a symbol in the check sum display field 101.

Next, the order sheet analysis section 52 calculates one check sum value based on the file name of each piece of image data described in the image information list T1 (S13) and determines whether or not the calculated check sum value matches the check sum value printed in the check sum display field 101 is determined (S114). If both the check sum values do not match (NO at S114), the read order sheet 64 and the current memory card 59 do not correspond to each other, for example, as with replacement with another memory card, and therefore error handling is performed and the processing is terminated (S116).

If both the check sum values match, the order sheet analysis section 52 generates a print list T2 for printing the image data selected through the order sheet 64 on the print paper selected through the order sheet 64 (S115). The print processing preciously described with reference to FIG. 20 is performed based on the generated print list T2.

Thus, according to the embodiment, it is made possible to update the image information list T1 not only when the memory card 59 is placed in the printer 1, but also at a predetermined timing. Therefore, the image information list T1 can be updated at the timing at which the most recent image information list T1 becomes necessary, print can be performed based on the most recent image data stored on the memory card 59, and the ease of use is improved.

In the embodiment, the image information list T1 is updated when a predetermined timing (when a print start command of image data stored on the memory card 59 is entered, by way of example) comes after image data is written onto the memory card 59 without updating the image information list T1 each time image data is written onto the memory card 59. Therefore, the most recent image information list T1 can be obtained only when necessary without increasing the processing load of the printer 1.

Second Example

Figure 22:
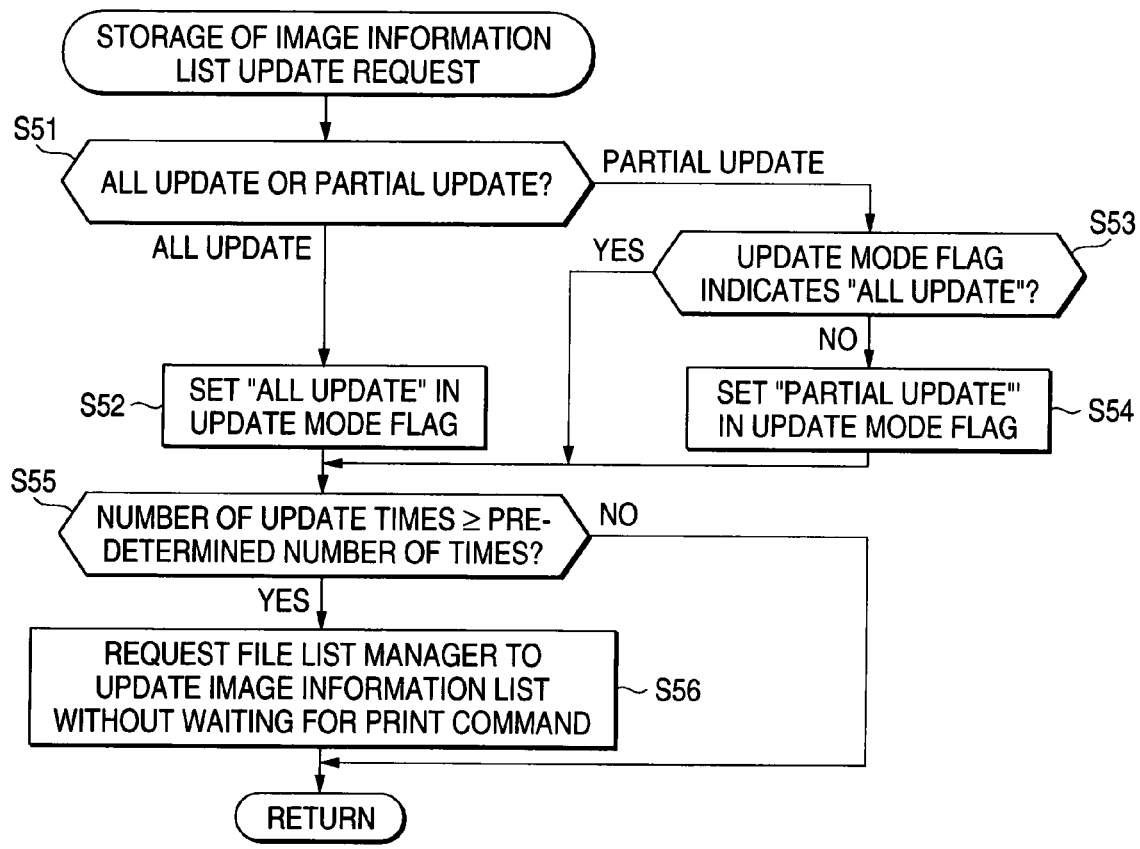
FIG. 22 is a flowchart to show storage processing of an image information list update request according to a second embodiment of the invention.

FIG. 22 is a flowchart to show storage processing of an image information list update request according to a second embodiment of the invention. Each embodiment described below corresponds to a modification of the first embodiment. The second embodiment is characterized in that if image data has been written onto the memory card 59 a predetermined number of times or more, an image information list T1 is updated without waiting for the user to enter a print start command.

That is, after either "all update" or "partial update" is set in an update mode flag, whether or not the number of times image data has been updated (the number of times image data has been written onto a memory card 59 from a scanner mechanism or a host computer PC) reaches a predetermined number of times is determined (S55). If the number of update times reaches the predetermined number of times (YES at S55), a service layer 220 requests a file list manager 430 to update the image information list T1 without waiting for the user to enter a print start command (S56).

Thus, if predetermined operation has been performed the predetermined number of times, the image information list T1 is updated, so that the image information list T1 based on the most recent state of the memory card 59 can also be obtained before the user issues a print command. Therefore, the thumbnail images of the most recent image data stored on the memory card 59 can be displayed, etc., on a display 21 of an operation panel 10 and the ease of use is improved.

Third Example

A third embodiment of the invention will be discussed with reference to FIGS. 23 to 27. In the embodiment, if image data in a memory card 59 is changed (for example, added or deleted) from a scanner integrated into a printer 1, an image information list T1 is partially updated with respect to the change part. In the embodiment, if an image in the memory card 59 is changed from an external host computer PC, the image information list T1 is maintained intact without being updated.

Figure 23:
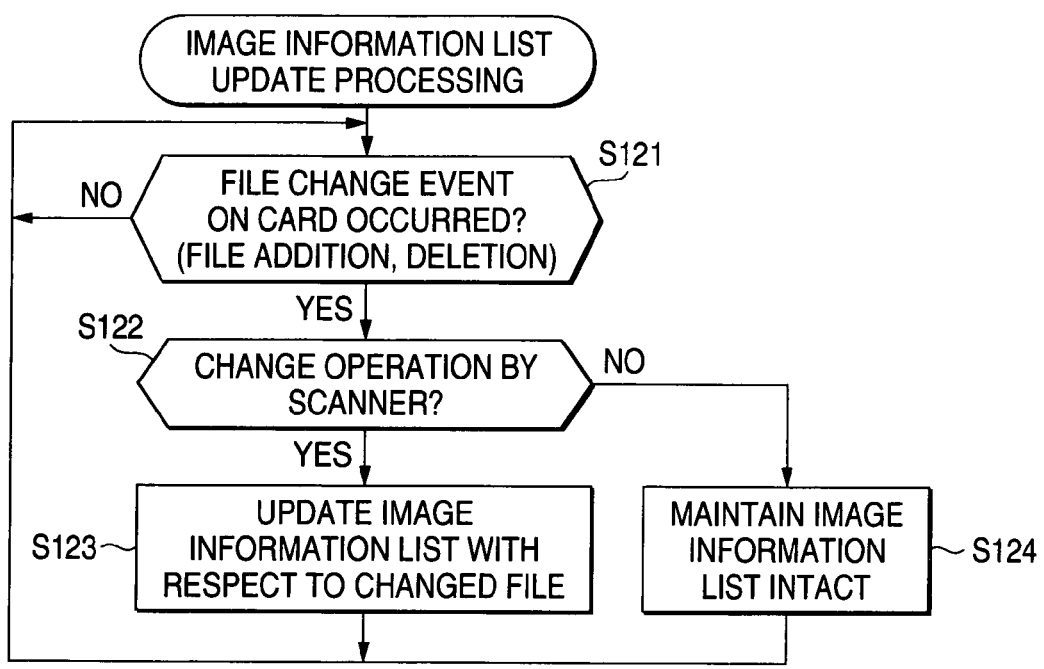
FIG. 23 is a flowchart of image information list update processing according to a third embodiment of the invention.

FIG. 23 is a flowchart to show an outline of update processing of the image information list T1. First, the printer 1 checks whether or not a file change event occurred in a memory card 59, for example, by a memory card device harness 310 (S121). Here, for example, image data addition or image data deletion can be named as the file change event.

When a file change event is detected (YES at S121), whether or not the file change is made by the scanner of the printer 1 is determined (S122). If the file change is made by the scanner (YES at S122), the image information list T1 is updated with respect to the changed file (S123). It should be noted that the update is executed partially as further described later. In contrast, if the file change is not made by the scanner (NO at S122), namely, if the host computer changes image data on the memory card 59 through the printer 1, the image information list T1 is not updated and is maintained intact (S124).

Figure 24:
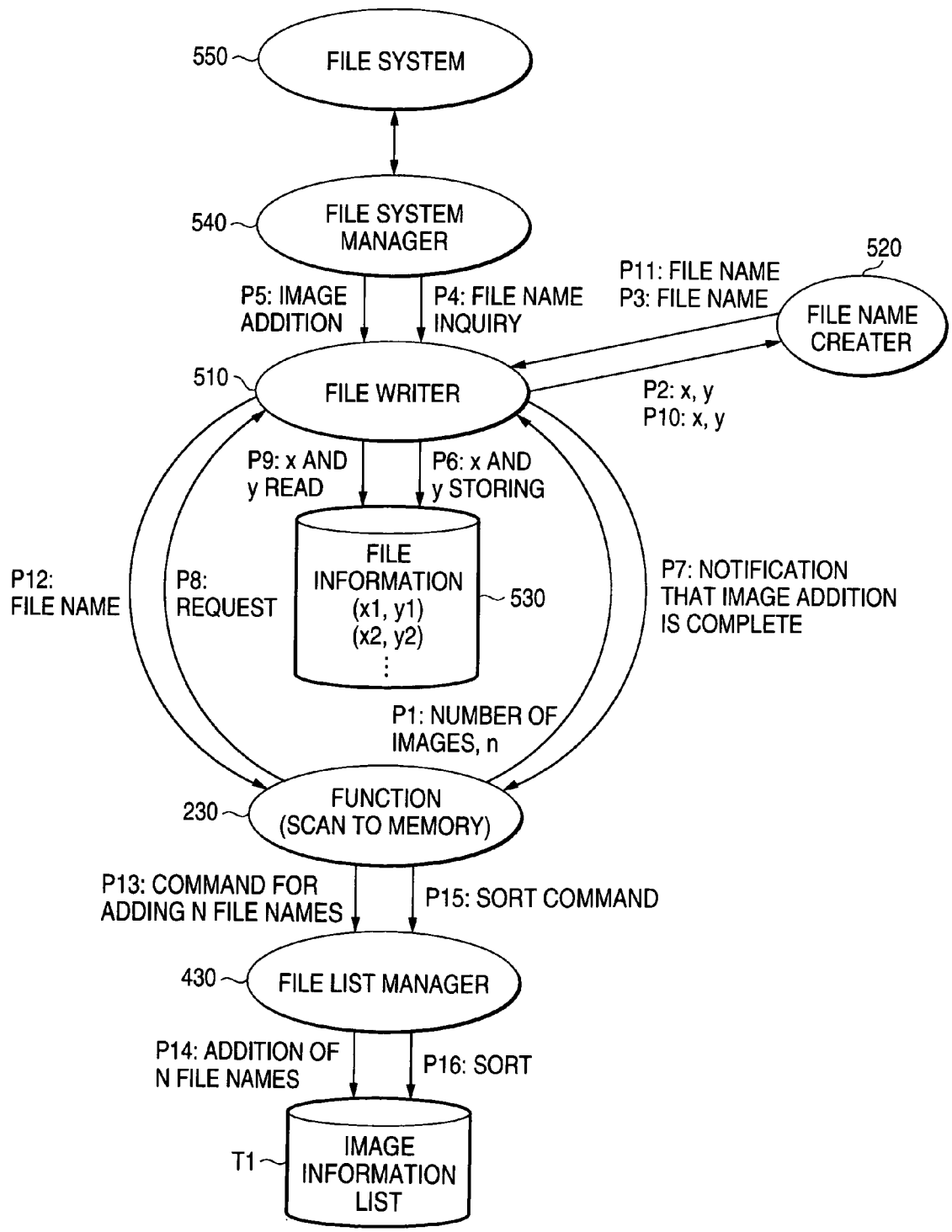
FIG. 24 is a schematic representation to schematically show the function configuration for limitedly updating an image information list.

FIG. 24 is a schematic drawing to show the function configuration for limitedly updating the image information list T1 with respect to the changed image data. FIG. 24 shows an example where image data is added to the memory card 59 from the scanner.

A file writer 510 is a function of writing a file onto the memory card 59. A file name creator 520 is a function of generating a file name and a file path (in FIG. 24, the file name and the file path are displayed as "file name") based on information passed from the file writer 510. File information 530 is provided for temporarily managing the file (image data) added by the scanner. A file system manager 540 stores new image data stored in local memory of the printer 1 in a predetermined location of the memory card 59 through a file system 550 of the memory card 59 in response to a request from the file writer 510.

Although the operation is described later in more detail, when a function 210 for executing "scan to memory" is called and the prescribed number of images to be added by the scanner, n, is input to the function 210, the number of images to be added, n, is sent from the function 210 to the file writer 510 (P1).

The file writer 510 generates basic information (x, y) to generate the file name and the file path that can be uniquely identified in the memory card 59, for example, by using two counters X and Y (not shown). For example, x is information to form the (sub)directory name and y is information to form the file name of image data like "A:¥EPSCAN¥x¥EPSy.jpg." Specifically, for example, the file name and the file path can be generated using x and y like "A:¥EPSCAN¥001¥EPS001.jpg," "A:¥EPSCAN¥002¥EPS002.jpg," etc.

When the file writer 510 inputs the basic information x and y to the file name creator 520 (P2), the file name creator 520 generates the file name and the file path as mentioned above and returns the file name and the file path to the file writer 510 (P3).

The file writer 510 inquires of the file system manager 540 whether or not the file name and the file path received from the file name creator 520 can be used (P4). The file system manager 540 references the file system of the memory card 59, checks whether or not the file name and the file path received from the file writer 510 are already used, and returns the check result.

If the file name and the file path cannot be used, the file writer 510 changes the values of the counters X and Y, generates new basic information x and y, and again inputs the basic information x and y to the file name creator 520.

If the file name and the file path can be used, the file writer 510 requests the file system manager 540 to add the image data stored in the local memory read by the scanner of the printer 1 (P5). The file system manager 540 stores the requested image data in the memory card 59 according to the specified file name and file path.

Whenever additional storage of the image data is completed, the file writer 510 registers the basic information x and y of the added image data in the file information 530 (P6). The file writer 510 generates as many file names and file paths as the number of images, n, specified by the user and additionally stores them in the memory card 59. The user may discontinue "scan to memory function." In this case, a different number of pieces of image data from the added number of images, n, specified at the beginning are additionally stored in the memory card 59.

If as many new image data pieces as the prespecified number of images, n, are added to the memory card 59 or if the "scan to memory function" is discontinued, the file writer 510 notifies the function 210 that addition of image data from the scanner to the memory card 59 is complete (P7).

The function 210 requests the file writer 510 to send the file names and the file paths of the added image data (P8). In response to this request, the file writer 510 reads the basic information x and y of each image data piece stored in the file information 530 (P9), inputs them to the file name creator 520 (P10), and acquires the file name and the file path of each image data piece (P11). The file writer 510 inputs the file name and the file path of each image data piece added by the scanner to the function 210 (P12).

The function 210 checks the number of added image data pieces, N (0≦N≦n), and requests a file list manager 430 to add the file names and the file paths of the N image data pieces added to the memory card 59 to the image information list T1 (P13). The request can contain other pieces of attribute information for recording in the image information list T1 (date, etc.,).

Upon reception of the request from the function 210, the file list manager 430 adds the file names and the file paths of the new added image data pieces to the image information list T1 (P14). Next, after completion of adding the file names, etc., to the image information list T1, the function 210 requests the file list manager 430 to sort the file names (P15). Upon reception of the request, the file list manager 430 sorts the file names recorded in the image information list T1, for example, in the ASCII code order (P16).

Thus, to directly add image data from the scanner of an internal image input unit to the memory card 59 and record the image data therein without the intervention of the host computer, the information concerning only on the added image data is added to the image information list T1. After the information concerning the added image data is added, the image information list T1 is updated.

Figure 25:
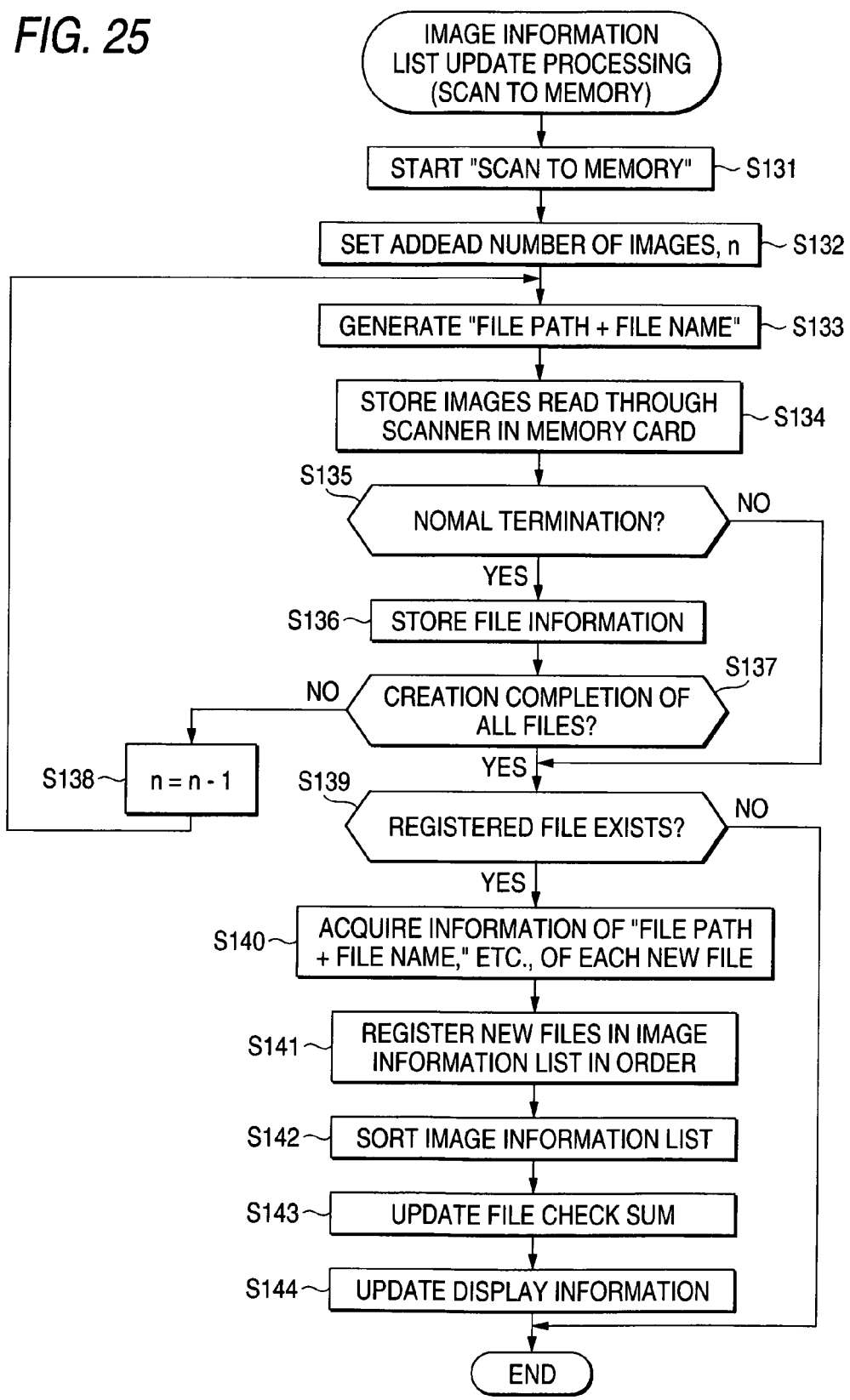
FIG. 25 is a flowchart to show image information list update processing when image data read through a scanner is added to a memory card.

FIG. 25 is a flowchart to show image information list update processing when the "scan to memory function" is used.

When the user selects the "scan to memory function," the "scan to memory" function 210 is started (S131). The user enters the prescribed number of images to be added from the scanner, n, through the user interface of the printer 1 (S132). The printer 1 generates the file names and the file paths (S133). The printer 1 performs predetermined processing (color conversion, compression, etc.,) for the image data through the scanner and saves the image data in the local memory (S134) Generating the file names and storing the image data may be executed in any order.

Upon normal completion of storing the image data (YES at S135), the printer 1 stores basic information x and y to identify the image data additionally stored in the memory card 59 in the file information 530 (S136) and determines whether or not creation (additional storage) of all files by the "scan to memory function" is complete (S137). If creation of all files is incomplete (NO at S137), the printer 1 decrements the added number of images, n, specified by the user by one (S138) and returns to S133.

Thus, if creation of all files by the "scan to memory function" is complete (YES at S137) as a result of repeating the steps S133 to S138, the printer 1 references the file information 530, thereby determining whether or not image data additionally stored in the memory card 59 exists (S139).

When the determination at S135 is NO, the user discontinues execution of the "scan to memory function," etc., for example, and therefore the printer 1 goes to S139.

If image data is added to the memory card 59 (YES at S139), the printer 1 acquires the file name and the file path of each newly added file (image data) (S140) and registers the acquired file names and file paths in the image information list T1 in order (S141). The printer 1 sorts the image information list T1 in accordance with a predetermined rule (S142), updates the file check sum (S143), and updates the display information of the user interface (S144). The display information update step may be skipped.

Figure 26:
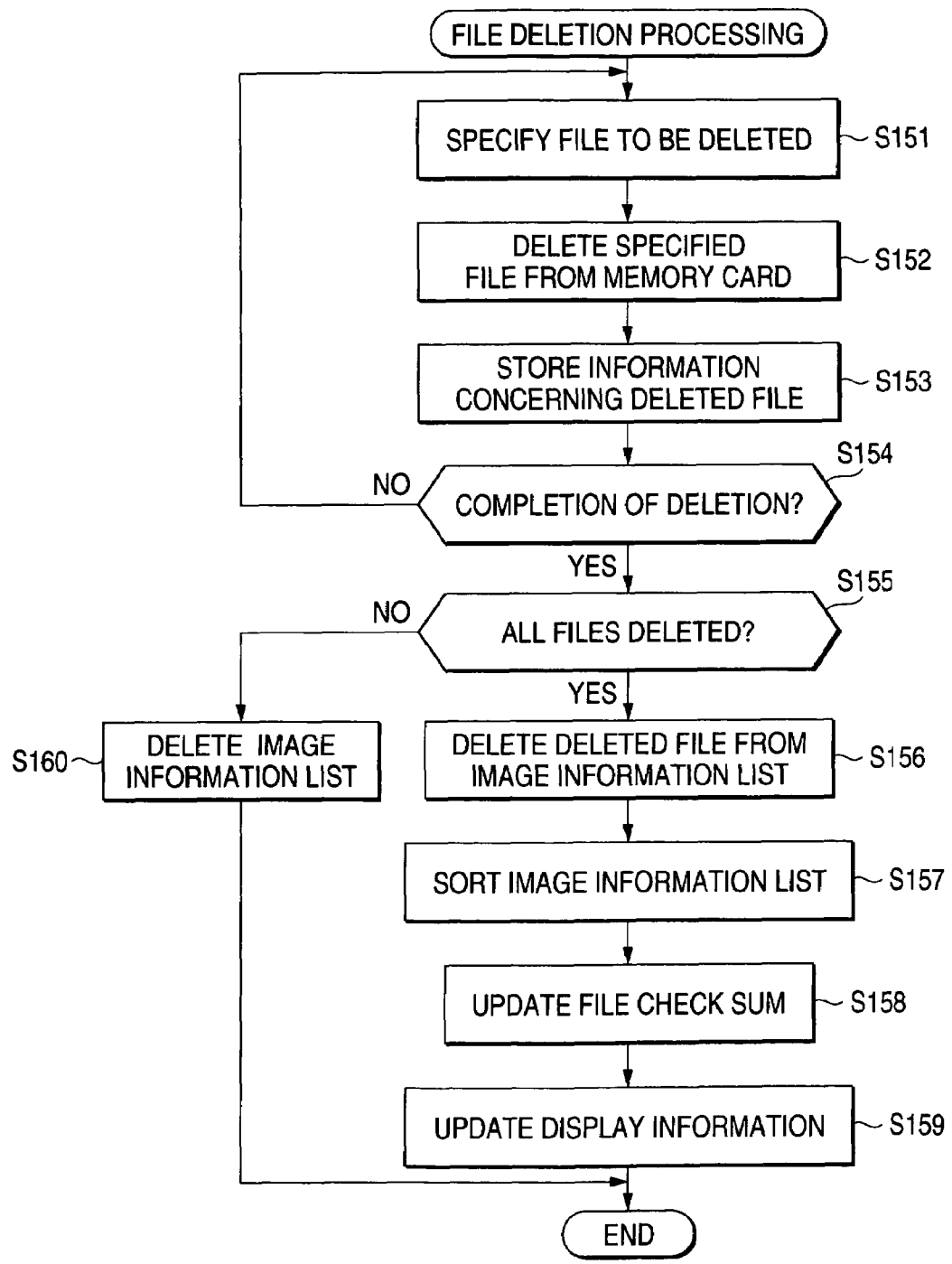
FIG. 26 is a flowchart to show file deletion processing.

FIG. 26 is a flowchart to show a processing outline for deleting the image data stored on the memory card 59. First, the user specifies the image data to be deleted through the user interface of the printer 1 (S151).

The printer 1 accesses the memory card 59 and deletes the image data specified by the user from the memory card 59 (S152). The printer 1 temporarily stores basic information x and y to identify the deleted image data in the file information 530 (S153) and determines whether or not the deletion processing is complete (S154). The steps S151 to S154 are repeated until the deletion processing is complete.

When the deletion processing is complete (YES at S154), whether or not all image data stored on the memory card 59 has been deleted is determined (S155). If one or more pieces of image data are left on the memory card 59 (NO at S155), the printer 1 deletes the deleted image data from the image information list T1 by referencing the file information 530 (S156) and then sorts the image information list T1 (S157). The printer 1 again calculates and updates the file check sum (S158) and updates the display information of the user interface (S159) The display information update step of the user interface may be skipped.

On the other hand, if the user has deleted all image data in the memory card 59 (YES at S155), it becomes unnecessary to retain the image information list T1 and therefore the image information list T1 is discarded (S160). The figure shows that the user selects the image data one piece at a time for deletion; however, a mode for selecting deletion of all files can be provided for enabling the user to delete all files by one operation without the need for selecting the image data in the memory card 59 each piece at a time if the user specifies the "all deletion mode."

Thus, when the image data has been deleted from the memory card 59, the deleted image data is erased from the image information list T1. Therefore, the user cannot select the deleted image data regardless of whether or not the memory card 59 is inserted or extracted.

Figure 27:
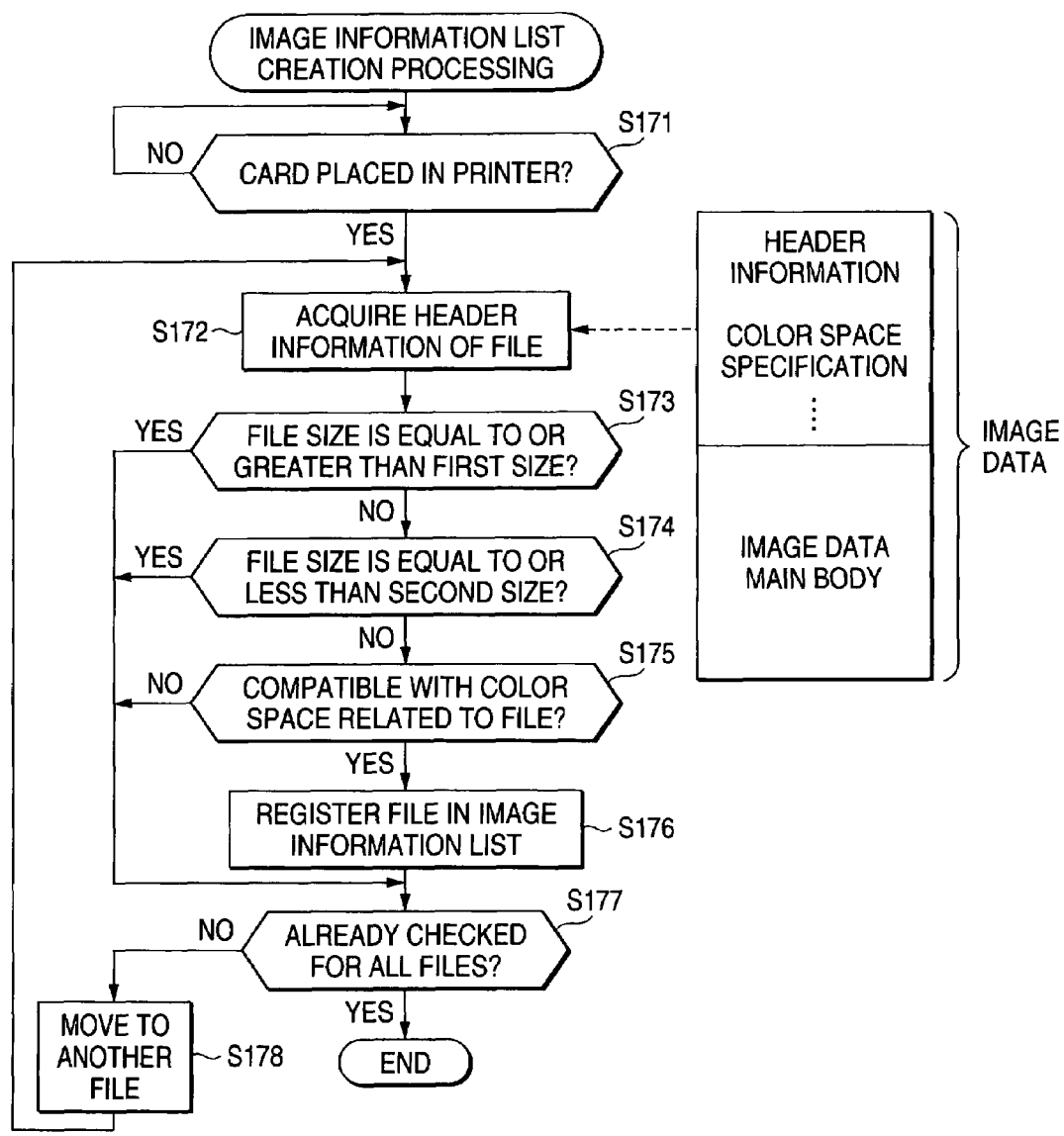
FIG. 27 is a flowchart to show processing of creating an image information list.

FIG. 27 is a flowchart to show an outline of processing of creating an image information list T1. This processing is executed, for example, when the memory card 59 is placed in the printer 1 (YES at S171).

When detecting the memory card 59 being placed in the printer 1, the printer 1 acquires the header information of each piece of the image data in the memory card 59 (S172). The header information contains information specifying the file size, color space, etc., for example.

The printer 1 determines whether or not the file size of the image data is equal to or greater than a first preset size (S173), and does not register the image data whose file size is equal to or greater than the first size in the image information list (YES at S173). The first size can be set to about 6000 pixels×4500 pixels, for example. Since the memory resources of the printer 1 are limited, too large image data is not registered in the image information list for preventing a reduction in the processing speed of the printer 1.

Next, the printer 1 determines whether or not the file size of the image data is equal to or greater than a second preset size (S174), and does not register the image data whose file size is equal to or less than the second size in the image information list (YES at S174).

In an EXIF format, one file contains essential image data and thumbnail image data and thus the check at S174 need not be performed. However, in other formats, thumbnail image data and essential image data may be stored in the memory card 59 as separate files. Then, if essential image data and thumbnail image data are stored as separate files, registering the thumbnail image data in the image information list T1 is inhibited. The second size can be set to about 160 pixels×120 pixels, for example.

Therefore, if the size of the image data is less than the first size and is equal to or greater than the second size, the image data can be registered in the image information list T1.

Next, the printer 1 determines whether or not the printer 1 is compatible with the color space specified for the image data (S175). For example, a unique color profile may be set for each vendor depending on the digital camera and if the printer 1 is incompatible with the unique color profile, there is a possibility that high-quality print cannot be accomplished. Then, the printer 1 registers only the image data for which compatible color space is specified in the image information list T1 (S176).

The printer 1 determines whether or not checking to see if the image data can be registered in the image information list T1 has been performed for all image data in the memory card 59 (S177). If the checking has been not yet performed for all image data, the printer 1 moves to another file (S178) and repeats the steps S172 to S176 described above. Thus, the printer 1 can use the header information of the image data to create the image information list T1.

Fourth Embodiment

Figure 28:
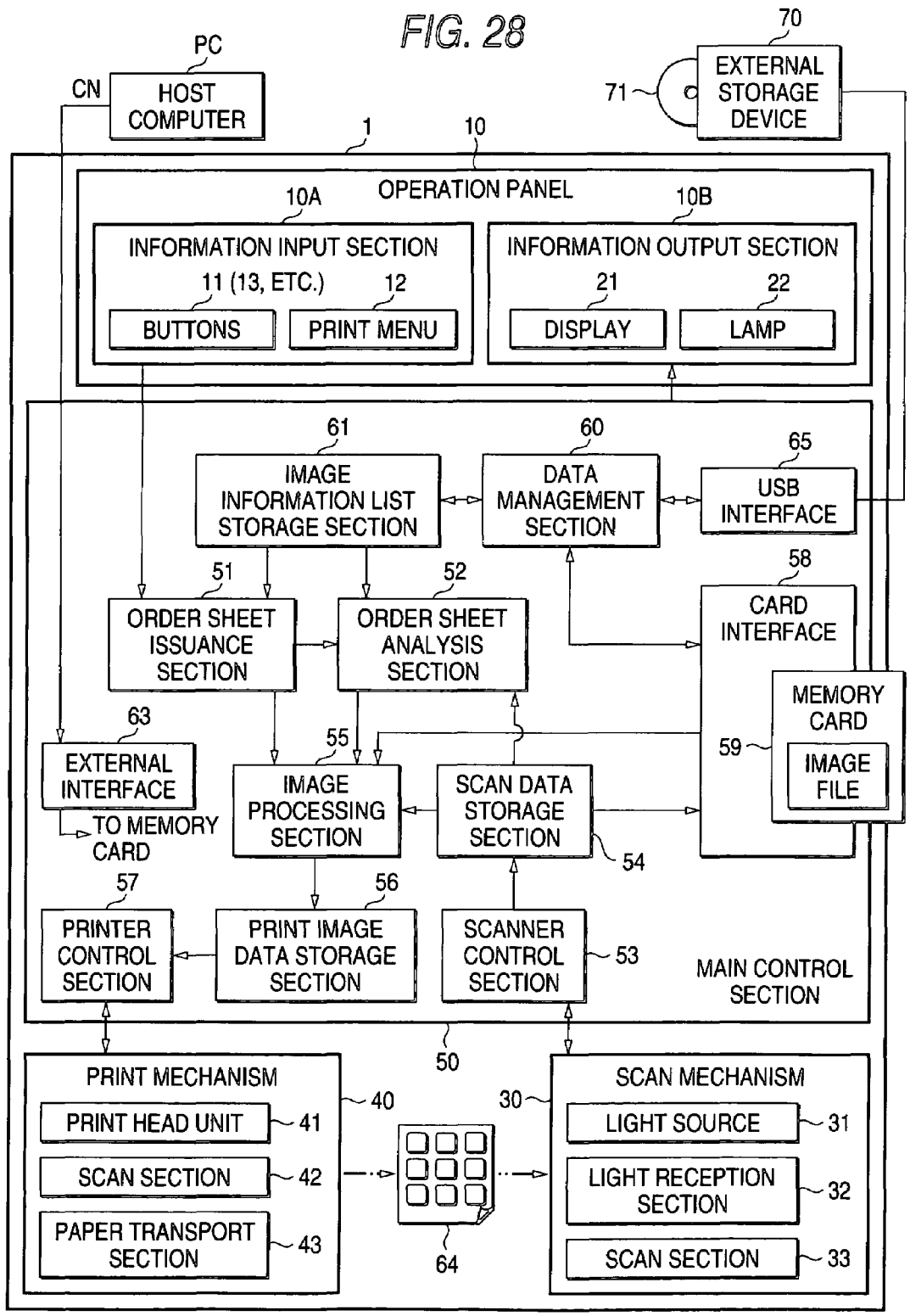
FIG. 28 is a block diagram of a printer according to a fourth embodiment of the invention.

A fourth embodiment of the invention will be discussed with reference to FIGS. 28 and 29. In addition to a memory card 59, an external storage device 70 corresponding to "second image record medium" is connected to a printer 1 of the embodiment through a USB I/F 65. FIG. 28 does not show insertion/extraction detection section 62 on account of space consideration, but the printer 1 of the embodiment can also include insertion/extraction detection section 62.

The USB I/F 65 is an interface functioning as a USB master. If image data, etc., is transmitted to and received from an image record medium 71 placed in the external storage device 70, the printer 1 plays an initiative role as the master device.

Both a host computer PC and the external storage device 70 can also be connected to one USB I/F 65. In this case, when the USB I/F 65 is connected to the external storage device 70, it functions as the USB master; when the USB I/F 65 is connected to the host computer PC, it functions as a USB slave.

Figure 29:
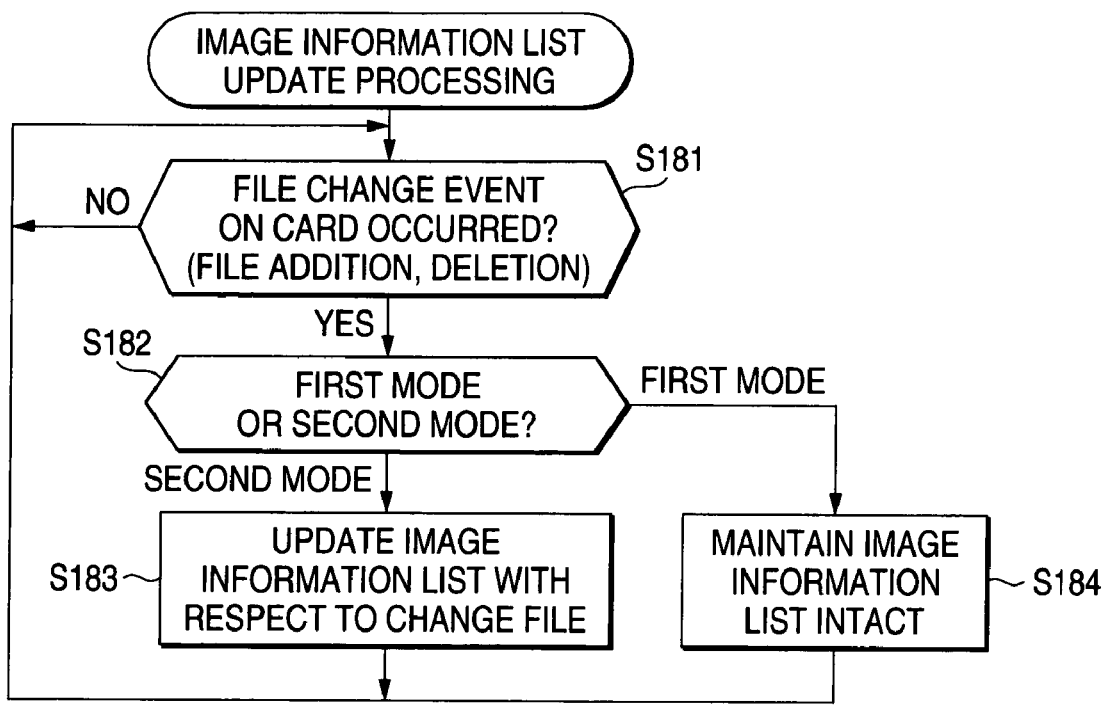
FIG. 29 is a flowchart to show image information list update processing.

FIG. 29 is a flowchart to show an outline of image information list update processing. The printer 1 checks whether or not a file change event occurred in a memory card 59 (S181). When a file change event is detected (YES at S181), whether the printer 1 is used in a first mode or a second mode is determined (S182). For example, if the printer 1 receives image data from the host computer PC, it can be determined that the printer 1 is used in the first mode; if the printer 1 transmits image data to the external storage device 70, it can be determined that the printer 1 is used in the second mode.

The first mode is a mode in which the printer 1 operates as a slave device and image data in the memory card 59 is updated by operation from the host computer PC. In contrast, the second mode is a mode in which the printer 1 operates as the master device and image data stored in the external storage device 70 is updated.

In the second mode, the printer 1 takes the initiative in data transmission and reception to and from the external storage device 70. Then, an image information list T1 is updated with respect to the changed image data of the image data stored in the external storage device 70 (S183) as in the embodiment described above.

In contrast, if the printer 1 is used in the first mode, the image information list T1 is not updated and is maintained intact (S184).

The embodiments of the invention described above are illustrative for the description of the invention and it is to be understood that the invention is not limited to the specific embodiments. It is further understood by those skilled in the art that various changes and modifications may be made in the invention without departing from the spirit and scope thereof.

For example, the external host computer can also be configured to access a memory card through the service layer or it is also possible to previously limit the directories that can be accessed by the external host computer. In these cases, if only the specific storage area of the memory card is again searched, the most recent image information list can be obtained.

Further, the invention can be applied not only to the printer, but also to other image processing apparatus.

The invention can also be grasped as the following print apparatus: A print apparatus including in one piece a read unit for reading image management information from a memory card recording the image management information without the intervention of a host (host computer), an image data generation unit, an addition unit for adding image data generated by the image data generation unit to the memory card, a unit for selecting the image data, a print unit for printing the selected image data, wherein when image data is added to the memory card, the selection unit makes the added image data selectable regardless of whether the memory card is inserted or extracted.

What is claimed is:

1. An image processing method comprising:
reading image management information stored on a first image record medium through a first interface unit;
generating an image information list based on the read image management information and storing the image information list in a storage unit;
updating the image information list stored in the storage unit at a predetermined timing when image data stored on the first image record medium is changed; and
reading the image data from the first image record medium through the first interface unit based on the image information list and performing predetermined image processing for the read image data,
wherein in the step of updating the image information list, a different search range to update the image information list is set in response to a change source for changing the image data stored on the first image record medium.

2. The image processing method according to claim 1, wherein when an external data generation apparatus changes the image data, the image management information concerning all image data stored on the first image record medium is the search range and when an image data generation unit of an image processing apparatus changes the image data, the image management information concerning the changed image data is the search range.

3. An image processing method comprising:
reading image management information stored on a first image record medium through a first interface unit;
generating an image information list based on the read image management information and storing the image information list in a storage unit;
updating the image information list stored in the storage unit at a predetermined timing when image data stored on the first image record medium is changed; and
reading the image data from the first image record medium through the first interface unit based on the image information list and performing predetermined image processing for the read image data,
wherein in the step of updating the image information list, when an external data generation apparatus connected through a second interface unit changes the image data, a new image information list is generated based on the image management information stored on the first image record medium and when an image data generation unit of an image processing apparatus adds the image data, information concerning the added image data is added to the image information list.

4. An image processing apparatus comprising:
a first interface unit that transmits and receives data to and from a first image record medium for recording at least image data;
a storage unit that stores an image information list generated based on image management information recorded on the first image record medium;
an update management unit that manages update of the image information list stored in the storage unit; and
an image processing unit that reads the image data from the first image record medium through the first interface unit based on the image information list and performs predetermined image processing,
wherein, when the image data stored on the first image record medium is changed, the update management unit updates the image information list at a predetermined timing,
wherein, when updating the image information list by the update management unit updates, a different search range to update the image information list is set in response to a change source for changing the image data stored on the first image record medium.

5. The image processing apparatus according to claim 4, wherein, when an external data generation apparatus changes the image data, the image management information concerning all image data stored on the first image record medium is the search range and when an image data generation unit of an image processing apparatus changes the image data, the image management information concerning the changed image data is the search range.

6. An image processing apparatus comprising:
a first interface unit that transmits and receives data to and from a first image record medium for recording at least image data;
a storage unit that stores an image information list generated based on image management information recorded on the first image record medium;
an update management unit that manages update of the image information list stored in the storage unit; and
an image processing unit that reads the image data from the first image record medium through the first interface unit based on the image information list and performs predetermined image processing,
wherein, when the image data stored on the first image record medium is changed, the update management unit updates the image information list at a predetermined timing, and
wherein, during updating the image information list by the update management unit, when an external data generation apparatus connected through a second interface unit changes the image data, a new image information list is generated based on the image management information stored on the first image record medium and when an image data generation unit of the image processing apparatus adds the image data, information concerning the added image data is added to the image information list.

7. A print apparatus comprising:
a control unit comprising an access unit that accesses a memory card for storing image data and a unit that selects the image data stored on the memory card; and
a print unit that acquires the selected image data from the memory card through the access unit and prints the acquired image data,
wherein the control unit flirt her comprises:
a storage unit that stores an image information list generated based on image management information recorded on the memory card;
an update management unit that manages update of the image information list stored in the storage unit; and
an image processing unit that reads the image data from the memory card through the access unit based on the image information list and performs predetermined image processing,
wherein, when the image data stored on the memory card is changed, the update management unit updates the image information list at a predetermined timing, and
wherein, when updating the image information list by the update management unit updates, a different search range to update the image information list is set in response to a change source for changing the image data stored on the first image record medium.

8. The print apparatus according to claim 7, wherein, when an external data generation apparatus changes the image data, the image management information concerning all image data stored on the memory card is the search range and when the image data changes, the image management information concerning the changed image data is the search range.

9. A print apparatus comprising:
a control unit comprising an access unit that accesses a memory card for storing image data and a unit that selects the image data stored on the memory card; and
a print unit that acquires the selected image data from the memory card through the access unit and prints the acquired image data,
wherein the control unit flirt her comprises:
a storage unit that stores an image information list generated based on image management information recorded on the memory card;
an update management unit that manages update of the image information list stored in the storage unit; and
an image processing unit that reads the image data from the memory card through the access unit based on the image information list and performs predetermined image processing, wherein, when the image data stored on the memory card is changed, the update management unit updates the image information list at a predetermined timing, and wherein, during updating the image information list by the update management unit, when an external data generation apparatus connected through an interface unit changes the image data, a new image information list is generated based on the image management information stored on the memory card and when an image data generation unit of the printer apparatus adds the image data, information concerning the added image data is added to the image information list.

* * * * *